United States Patent
Tanaka et al.

(10) Patent No.: US 9,501,688 B2
(45) Date of Patent: Nov. 22, 2016

(54) APPARATUS, PROCESSING METHOD AND STORAGE MEDIUM STORING PROGRAM

(71) Applicant: CANON KABUSHIKI KAISHA, Tokyo (JP)

(72) Inventors: Wakako Tanaka, Inagi (JP); Kiyoshi Umeda, Kawasaki (JP); Hiroyuki Sakai, Chigasaki (JP); Hiroyasu Kunieda, Yokohama (JP); Naoki Sumi, Kawasaki (JP); Yusuke Hashii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 13/922,004

(22) Filed: Jun. 19, 2013

(65) Prior Publication Data
US 2014/0010416 A1 Jan. 9, 2014

(30) Foreign Application Priority Data
Jul. 9, 2012 (JP) .................................. 2012-154008

(51) Int. Cl.
*G06K 9/00* (2006.01)
*H04N 5/232* (2006.01)

(52) U.S. Cl.
CPC ....... *G06K 9/00228* (2013.01); *G06K 9/00221* (2013.01); *H04N 5/23219* (2013.01)

(58) Field of Classification Search
CPC combination set(s) only.
See application file for complete search history.

(56) References Cited

U.S. PATENT DOCUMENTS

| | | | |
|---|---|---|---|
| 5,218,387 A | 6/1993 | Ueno et al. | |
| 6,885,760 B2 | 4/2005 | Yamada et al. | |
| 6,895,103 B2 | 5/2005 | Chen et al. | |
| 7,613,332 B2 * | 11/2009 | Enomoto | G06K 9/00248 348/152 |
| 7,699,423 B2 | 4/2010 | Suwa et al. | |
| 8,401,232 B2 * | 3/2013 | Fan et al. | 382/103 |
| 8,693,740 B1 * | 4/2014 | Sridhara et al. | 382/118 |
| 8,891,853 B2 * | 11/2014 | Shinkai | 382/154 |
| 8,948,468 B2 * | 2/2015 | Steinberg et al. | 382/118 |
| 2002/0081032 A1 | 6/2002 | Chen | |
| 2006/0008145 A1 * | 1/2006 | Kaku | G06K 9/00228 382/173 |
| 2006/0018517 A1 | 1/2006 | Chen et al. | |
| 2007/0201742 A1 * | 8/2007 | Hayashi | 382/167 |

(Continued)

FOREIGN PATENT DOCUMENTS

| | | |
|---|---|---|
| JP | 5-197793 A | 8/1993 |
| JP | 8-63597 A | 3/1996 |

(Continued)

OTHER PUBLICATIONS

U.S. Appl. No. 13/932,686, filed Jul. 1, 2013, Applicants: Takashi Nakamura, et al.

(Continued)

*Primary Examiner* — Utpal Shah
(74) *Attorney, Agent, or Firm* — Fitzpatrick, Cella, Harper & Scinto

(57) ABSTRACT

An apparatus includes a detection unit configured to detect an object from image data, and a processing unit configured to perform processing for the object detected by the detection unit. The detection unit includes a first detection unit and a second detection unit having a detection tolerance wider than that of the first detection unit, and the object is detected by selecting the first detection unit or the second detection unit in accordance with the contents of the processing to be performed by the processing unit.

35 Claims, 41 Drawing Sheets

(56) References Cited

U.S. PATENT DOCUMENTS

| | | | |
|---|---|---|---|
| 2007/0291999 A1* | 12/2007 | Ito et al. | 382/118 |
| 2008/0080748 A1* | 4/2008 | Sukegawa et al. | 382/118 |
| 2009/0220123 A1* | 9/2009 | Tojo | G06K 9/00771 382/103 |
| 2009/0245634 A1* | 10/2009 | Matsuzaka | G06K 9/00308 382/167 |
| 2009/0324069 A1* | 12/2009 | Kawai | G06T 5/008 382/165 |
| 2010/0166317 A1* | 7/2010 | Li et al. | 382/195 |
| 2010/0245614 A1* | 9/2010 | Matsunaga | 348/222.1 |
| 2010/0260415 A1 | 10/2010 | Sakai et al. | |
| 2010/0295998 A1* | 11/2010 | Sakai et al. | 348/700 |
| 2010/0329565 A1* | 12/2010 | Kunieda | 382/190 |
| 2012/0099762 A1 | 4/2012 | Kunieda | |
| 2012/0159292 A1* | 6/2012 | Leynadier et al. | 715/202 |

FOREIGN PATENT DOCUMENTS

| | | |
|---|---|---|
| JP | 8-77334 A | 3/1996 |
| JP | 2541688 B | 10/1996 |
| JP | 11-53525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 10/2001 |
| JP | 2002-183731 A | 6/2002 |
| JP | 2003-030667 A | 1/2003 |
| JP | 2003-317084 A | 11/2003 |
| JP | 3469031 B | 11/2003 |
| JP | 2005-293096 A | 10/2005 |
| JP | 2007-11970 A | 1/2007 |
| JP | 2008-225720 A | 9/2008 |
| JP | 2009-237616 A | 10/2009 |
| JP | 2010-010946 A | 1/2010 |
| JP | 2010-251999 A | 11/2010 |
| JP | 2010-273144 A | 12/2010 |
| JP | 2011-008704 A | 1/2011 |
| JP | 4985510 | 7/2012 |

OTHER PUBLICATIONS

Japanese Office Action dated Jul. 19, 2016 in Japanese Application No. 2012-154008.

* cited by examiner

F I G. 10

| SENSING CLASSIFICATION | SENSING SUB-CLASSIFICATION | DATA TYPE | VALUE |
|---|---|---|---|
| BASIC IMAGE FEATURE AMOUNT | AVERAGE LUMINANCE | int | 0~255 |
| | AVERAGE SATURATION | int | 0~255 |
| | AVERAGE HUE | int | 0~359 |
| FACE DETECTION | NUMBER OF PERSON'S FACES | int | 0~MAXFACE |
| | FACE RELIABILITY LEVEL | int | 0~100 |
| | COORDINATE POSITION | int * 8 | 0~Width or Height |
| | AVERAGE Y IN FACE REGION | int | 0~255 |
| | AVERAGE Cb IN FACE REGION | int | -128~127 |
| | AVERAGE Cr IN FACE REGION | int | -128~127 |
| SCENE ANALYSIS | SCENE RESULT | char | Landscape<br>Nightscape<br>Portrait<br>Underexposure<br>Others |

F I G. 11

```xml
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                        <Weight>60</Weight>
                </Person>
                ...
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        ...
</IMAGEINFO>
```

FIG. 12

| CLASSIFICATION | CONTENTS | DATA TYPE | VALUE |
|---|---|---|---|
| IMAGE | FAVORITE RATE | int | 0~5 |
| | EVENT | char | "travel" "graduation" "wedding" |
| | | | |
| PERSON | NAME | char | "NAME" |
| | BIRTHDAY | char | YYYMMDD |
| | FAMILY RELATIONSHIP | char | "family" "" |
| | | | |

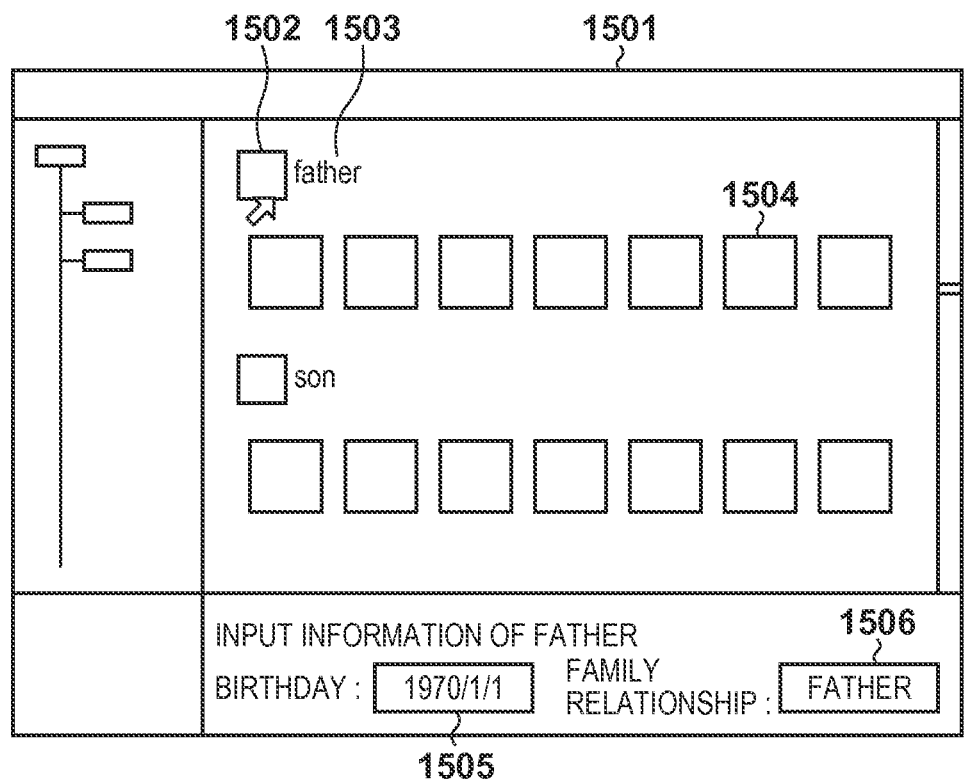

F I G. 18

```
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 20

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

F I G. 24

| CATEGORY | | CONTENTS | SCORE RANGE | DEGREE OF IMPORTANCE FOR EACH THEME (WEIGHT W) | | |
|---|---|---|---|---|---|---|
| | | | | growth | travel | ... |
| INDIVIDUAL IMAGE EVALUATION | | BRIGHTNESS APPROPRIATENESS | 0~100 | 0.5 | 1.0 | |
| | | SATURATION APPROPRIATENESS | 0~100 | 0.5 | 1.0 | |
| IMAGE/SLOT MATCHING EVALUATION | | PERSON MATCHING | 0~100 | 1.0 | 0.5 | |
| | | TRIMMING LOSS DETERMINATION | 0~100 | 1.0 | 0.5 | |
| IN-PAGE BALANCE EVALUATION | | IMAGE SIMILARITY | 0~100 | 0.5 | 1.0 | |
| | | HUE VARIATION | 0~100 | 0.5 | 1.0 | |
| | | FACE SIZE VARIATION | 0~100 | 0.5 | 1.0 | |
| OTHERS | | USER'S TASTE | 0~100 | 0.8 | 0.8 | |

| IMAGE ID | CAPTURING DATE/TIME(YYYYMMDD : HHMMSS) |
|---|---|
| 25 | 20100101 : 120000 |
| 86 | 20100101 : 150000 |
| 102 | 20100101 : 170000 |
| 108 | 20100101 : 173000 |

FIG. 30

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

F I G. 31

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

F I G. 32

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimingRatio>50.0</TrimingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimingRatio>38.0</TrimingRatio>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimingRatio>53.0</TrimingRatio>
        </ImageSlot>
        .......
</LayoutInfo>
```

FIG. 35A
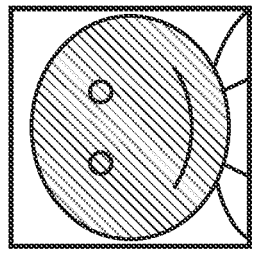
| PERSON RECOGNITION | MR. A(○) |
|---|---|
| SKIN RETOUCH | ○ |
| FACE SLIMMING | ○ |
| MOLE REMOVAL | ○ |
| ⋮ | |
FIG. 35B
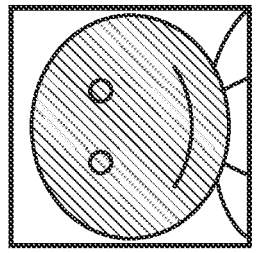 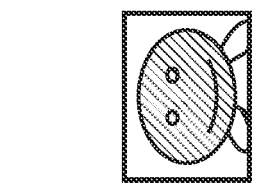 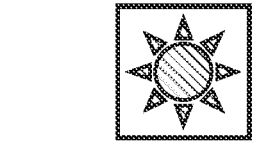
| PERSON RECOGNITION | MR. A(○) | MR. B(○) | MR. B(✕) |
|---|---|---|---|
| SKIN RETOUCH | ○ | ○ | ✕ |
| FACE SLIMMING | ○ | ○ | ✕ |
| MOLE REMOVAL | ○ | ○ | ✕ |
| ⋮ | | | |

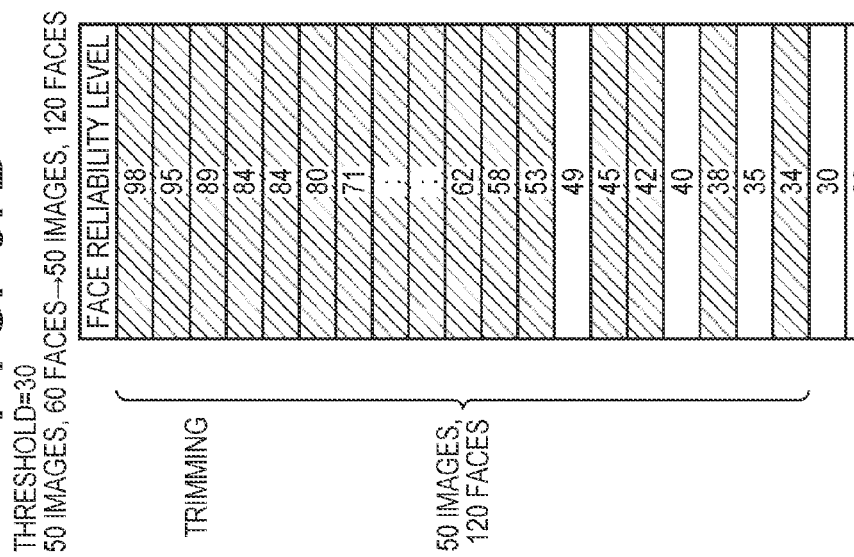
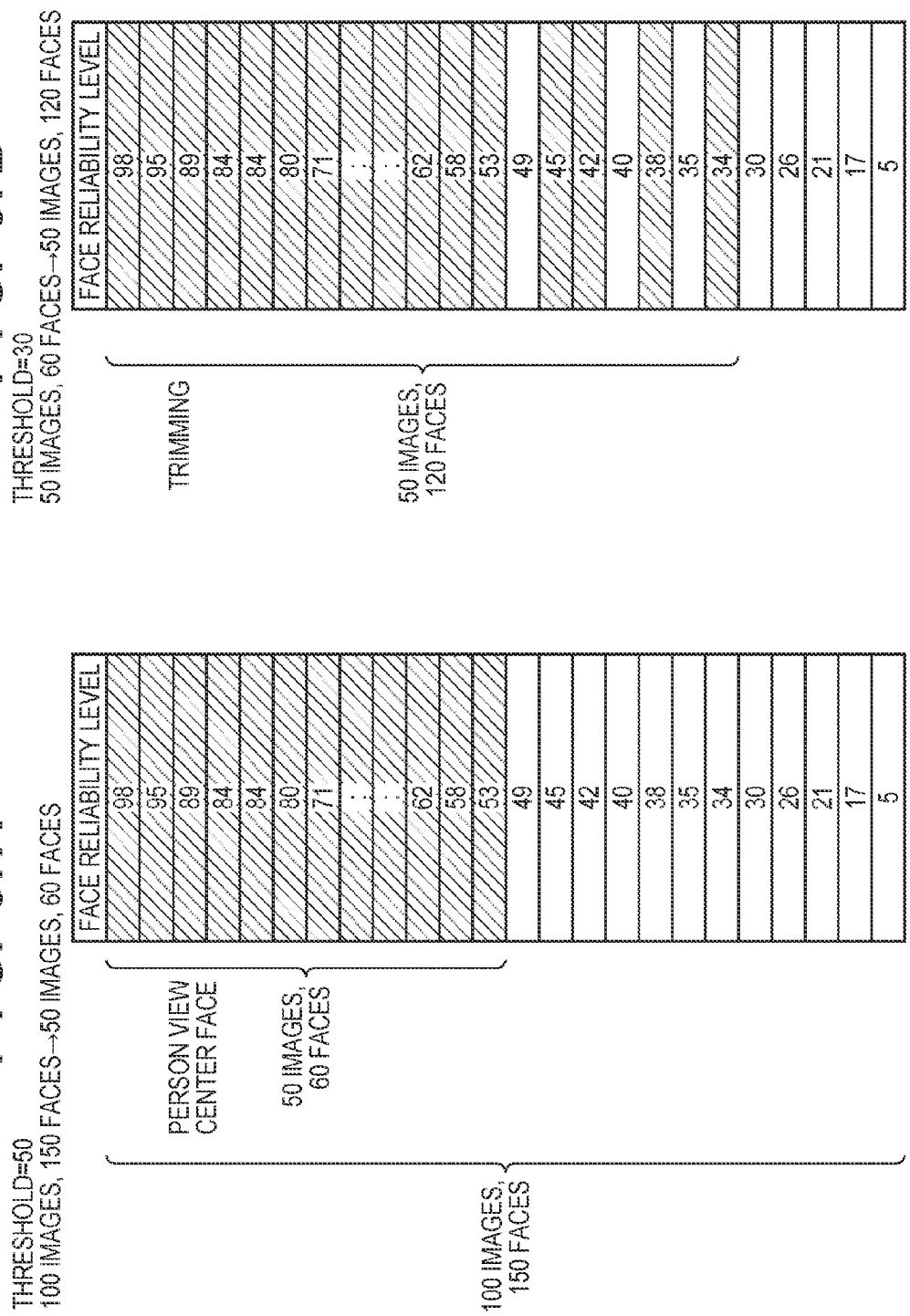

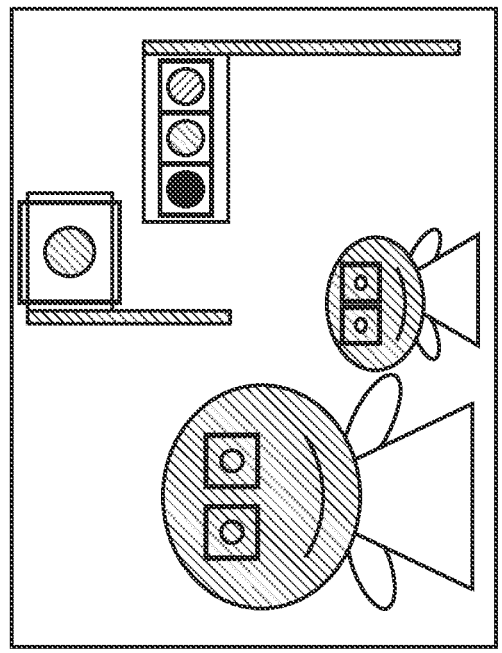
F I G. 44A
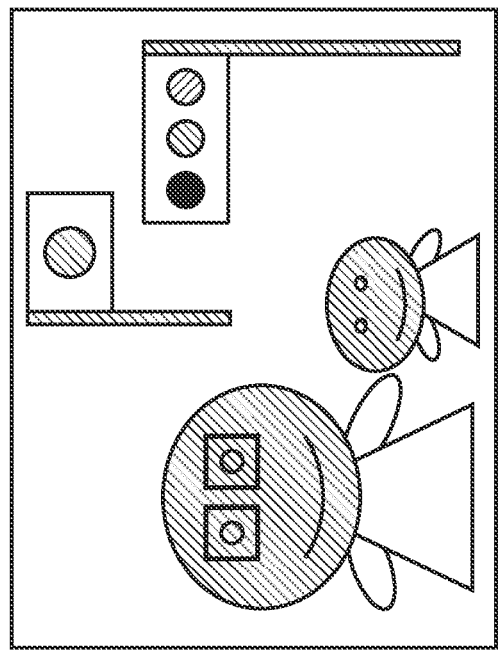
F I G. 44B

APPARATUS, PROCESSING METHOD AND STORAGE MEDIUM STORING PROGRAM

BACKGROUND OF THE INVENTION

Field of the Invention

The present invention relates to an apparatus for executing image processing for image data, a processing method, and a storage medium storing a program.

Description of the Related Art

Conventionally, various kinds of processing are performed as object detection in an image and image processing. Especially known is a method that combines detection and image processing so that a person in an image is detected, and various kinds of correction processing are then performed for the detected person. The method combining detection and image processing is very effective because the user need not manually set the target of image processing, for example, a person's face. According to this method, it is possible to automatically detect a person's face and perform image processing such as skin retouch, red-eye correction, mole removal, and person recognition for the detected face. It is also possible to trim the image so as to leave the automatically detected person's face.

Japanese Patent Laid-Open No. 2008-225720 describes an image trimming apparatus for setting a trimming region including a face in an image including the face. The center position of the face is detected based on a detection result by a face detection means, and the trimming region is set about the center position.

In the object detection method disclosed in Japanese Patent Laid-Open No. 2008-225720, however, when the detection result reliability level is set high, only an object of high reliability level is detected. Hence, an "undetected error" that means missing the detection target occurs. On the other hand, when the detection result reliability level is set low, an object of low reliability level is detected as well. Hence, a "detection error" that means detecting an object different from the detection target occurs. If an undetected error or a detection error occurs at the time of object detection, subsequent image processing is performed for an unintended image.

SUMMARY OF THE INVENTION

An aspect of the present invention is to eliminate the above-mentioned problems with the conventional technology. The present invention provides an apparatus for suppressing inappropriate image processing for an image, a processing method, and a storage medium storing a program.

The present invention in its first aspect provides an apparatus comprising: a detection unit configured to detect an object from image data; and a processing unit configured to perform processing for the object detected by the detection unit, wherein the detection unit includes a first detection unit and a second detection unit having a detection tolerance wider than that of the first detection unit, and the object is detected by selecting one of the first detection unit and the second detection unit in accordance with contents of the processing to be performed by the processing unit.

According to the present invention, it is possible to suppress inappropriate image processing for an image.

Further features of the present invention will become apparent from the following description of exemplary embodiments with reference to the attached drawings.

BRIEF DESCRIPTION OF THE DRAWINGS

FIG. 10 is a table showing an example of attribute information obtained by image analysis;

FIG. 11 is a view showing an example of an image analysis result saving format;

FIG. 12 is a table showing an example of attribute information that can manually be input by a user;

FIG. 15 is a view showing an example of a UI used to manually input person attribute information;

FIG. 16 is a view showing an example of a person attribute information saving format;

FIG. 18 is a view showing an example of the holding format of the layout template shown in FIG. 17;

FIG. 20 is a view showing an example of the holding format of the layout template shown in FIG. 19;

FIG. 24 is a table showing an example of layout evaluation values when performing automatic layout;

FIG. 30 is a view showing an example of holding a decided theme and main character information;

FIG. 31 is a view showing an example of holding a decided theme and main character information;

FIG. 32 is a view showing an example of holding generated automatic layout information;

FIGS. 35A and 35B are views showing results obtained by performing processing for the faces;

FIGS. 37A and 37B are conceptual views showing 150 faces stored in a database 202 which are arranged in descending order of face reliability level;

FIGS. 44A and 44B are views showing detection results obtained by performing eye detection while changing the detection result reliability level;

DESCRIPTION OF THE EMBODIMENTS

Figure 1:
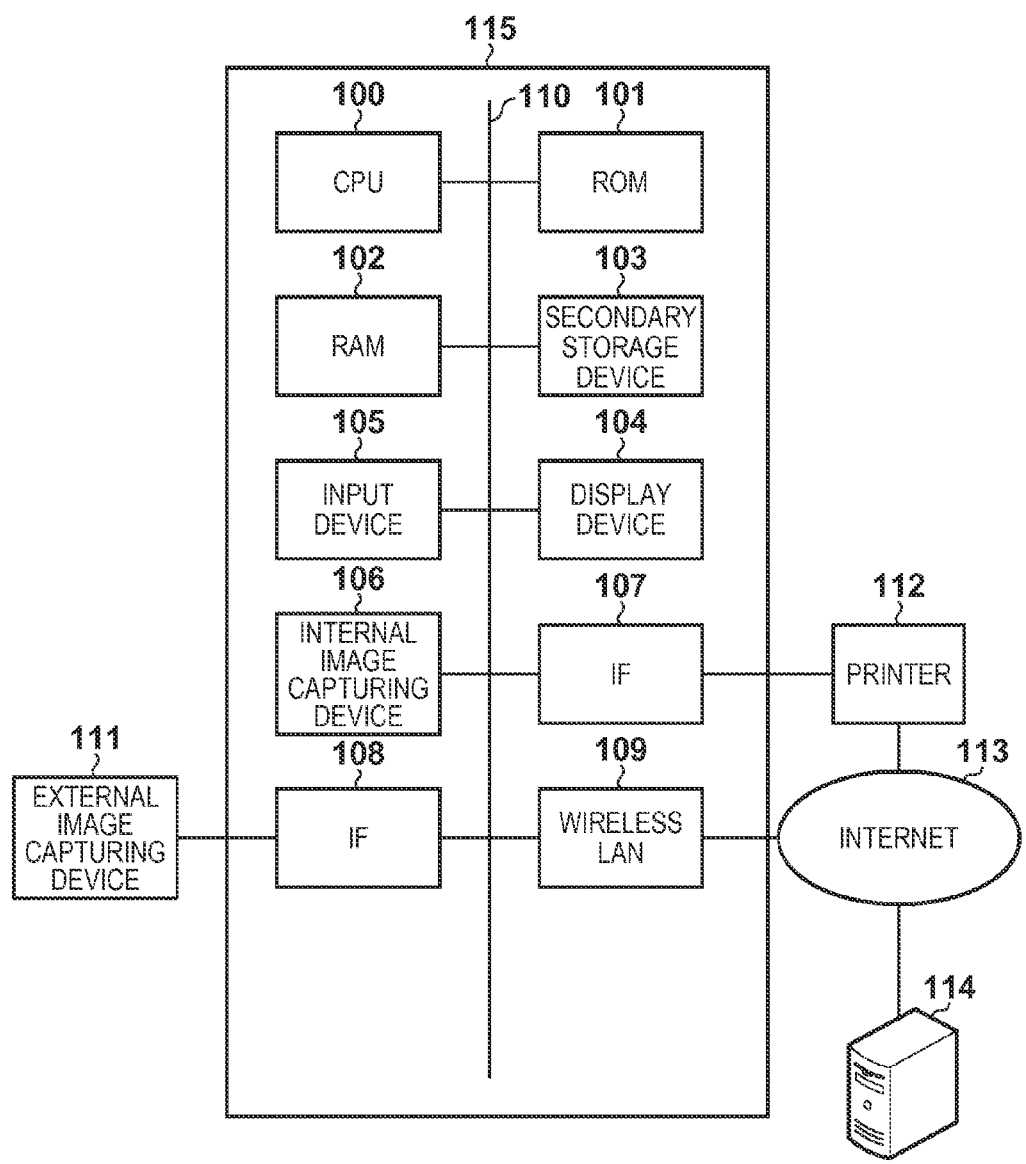
FIG. 1 is a block diagram showing a hardware arrangement capable of executing software of the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

The first embodiment of the present invention will be described below to automatically generate a layout output matter using an input image group. This merely exemplifies a form of implementation, and the present invention is not limited to the following embodiment.

First Embodiment

FIG. 1 is a block diagram for explaining an example of the hardware arrangement of an information processing apparatus according to the first embodiment. Referring to FIG. 1, a CPU 100 is a central processing unit which executes an information processing method to be described in this embodiment in accordance with programs. A ROM 101 stores the programs to be executed by the CPU 100. A RAM 102 provides a memory to temporarily store various kinds of information when the CPU 100 executes the programs. A hard disk 103 is a secondary storage device and serves as a storage medium to save, for example, a database that saves image files and image analysis results. A display device 104 is, for example, a display. The display device 104 is a device that provides the user various kinds of UIs (User Interfaces) to be described below, including a processing result of this embodiment. The display device 104 may have a touch panel function. A control bus/data bus 110 connects the above-described units to the CPU 100. The information processing apparatus also includes an input device 105 such as a pointing device or a keyboard used by the user to input an image correction processing instruction and the like.

An information processing apparatus 115 may include an internal image capturing device 106. An image captured by the internal image capturing device undergoes predetermined image processing and is saved in the secondary storage device 103. Image data may be loaded from an external image capturing device 111 connected via an interface (IF 108). The information processing apparatus 115 also includes a wireless LAN (Local Area Network) 109. The LAN is connected to the Internet 113. It is also possible to acquire an image from an external server 114 connected to the Internet.

A printer 112 for outputting an image or the like is connected to the information processing apparatus 115 via an IF 107. Note that the printer is also connected to the Internet so that print data can be transmitted/received via the wireless LAN 109.

Figure 2:
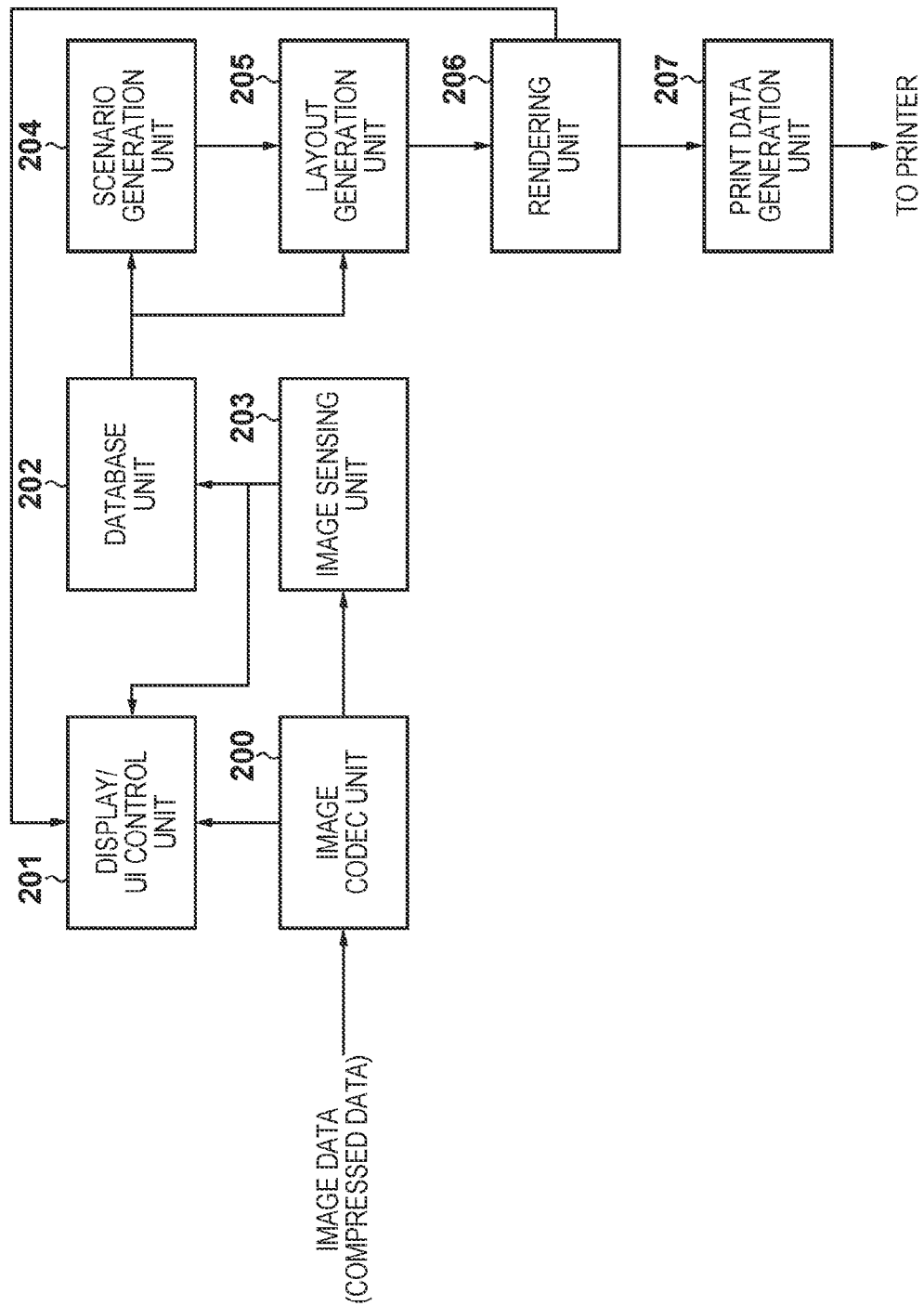
FIG. 2 is a block diagram showing a software block configuration of processing of the present invention.

FIG. 2 is a block diagram of a software configuration including the above-described application according to this embodiment.

Image data acquired by the information processing apparatus 115 normally has a compression format such as JPEG (Joint Photography Expert Group). Hence, an image codec unit 200 decompresses the compression format and converts it into a so-called RGB dot-sequential bitmap data format. The converted bitmap data is sent to a display/UI control unit 201 and displayed on the display device 104 such as a display (display control).

The bitmap data is also input to an image sensing unit 203 (application), which performs various kinds of analysis processing of the image (details to be described later). Various kinds of attribute information of the image obtained by the analysis processing are saved in the above-described secondary storage device 103 by a database unit 202 (application) in accordance with a predetermined format. Note that image analysis processing and sensing processing will be handled in the same sense hereinafter.

A scenario generation unit 204 (application) generates conditions of a layout to be automatically generated in accordance with various conditions input by the user (details to be described later). A layout generation unit 205 performs processing of automatically generating a layout in accordance with the scenario.

A rendering unit 206 generates the bitmap data of the generated layout for display. The bitmap data is sent to the display/UI control unit 201, and the result is displayed on the display device 104.

The rendering result is also sent to a print data generation unit 207 which converts the bitmap data into printer command data and sends it to a printer.

The basic procedure of image processing according to this embodiment will be described with reference to FIGS. 3 to 6.

Figure 3:
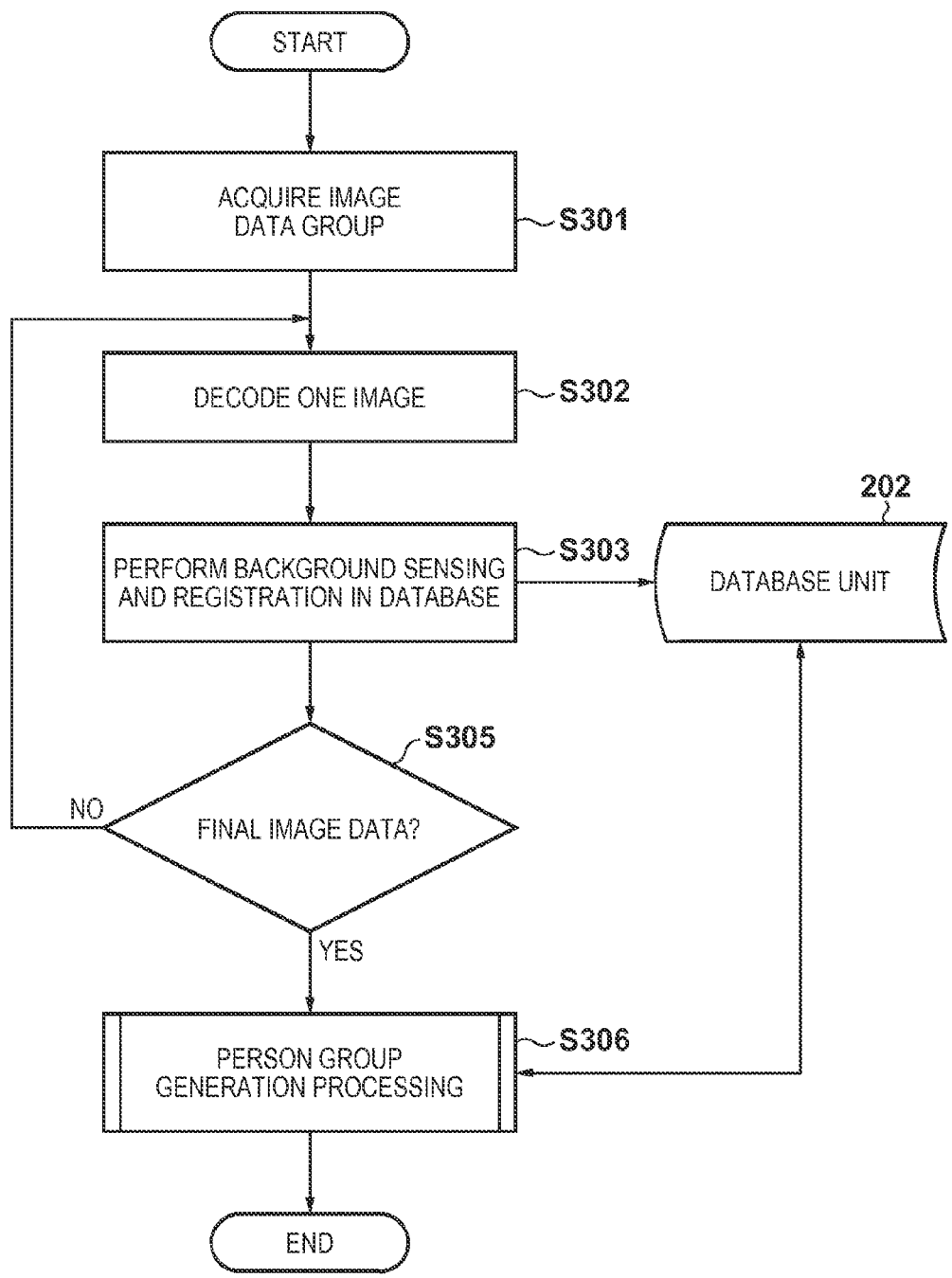
FIG. 3 is a flowchart of image analysis processing.
Figure 4:
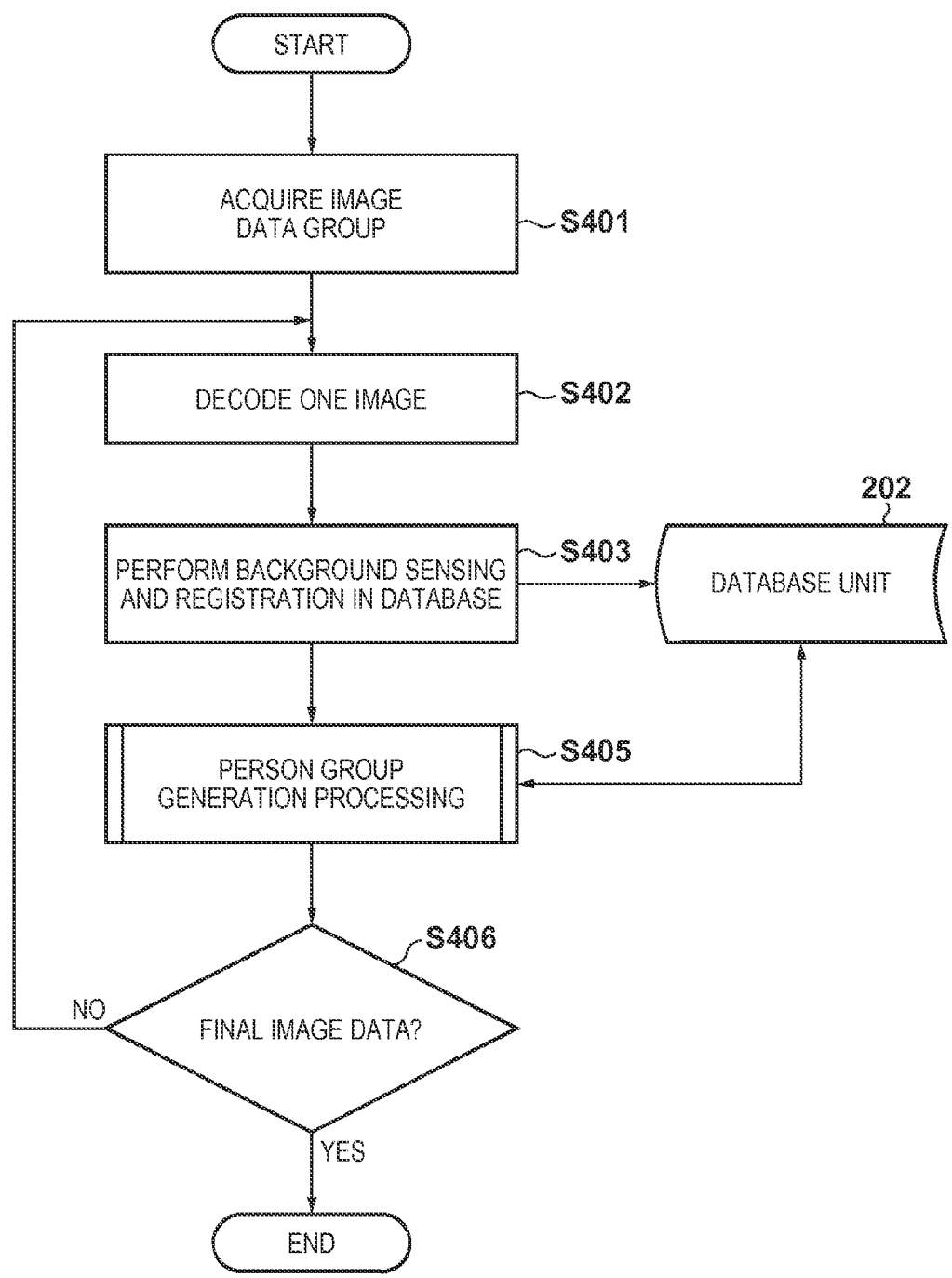
FIG. 4 is a flowchart of image analysis processing.

FIGS. 3 and 4 illustrate the procedure of the image sensing unit 203 or the procedure of acquiring a plurality of image data groups, performing analysis processing for each of them, and storing the result in the database.

Figure 5:
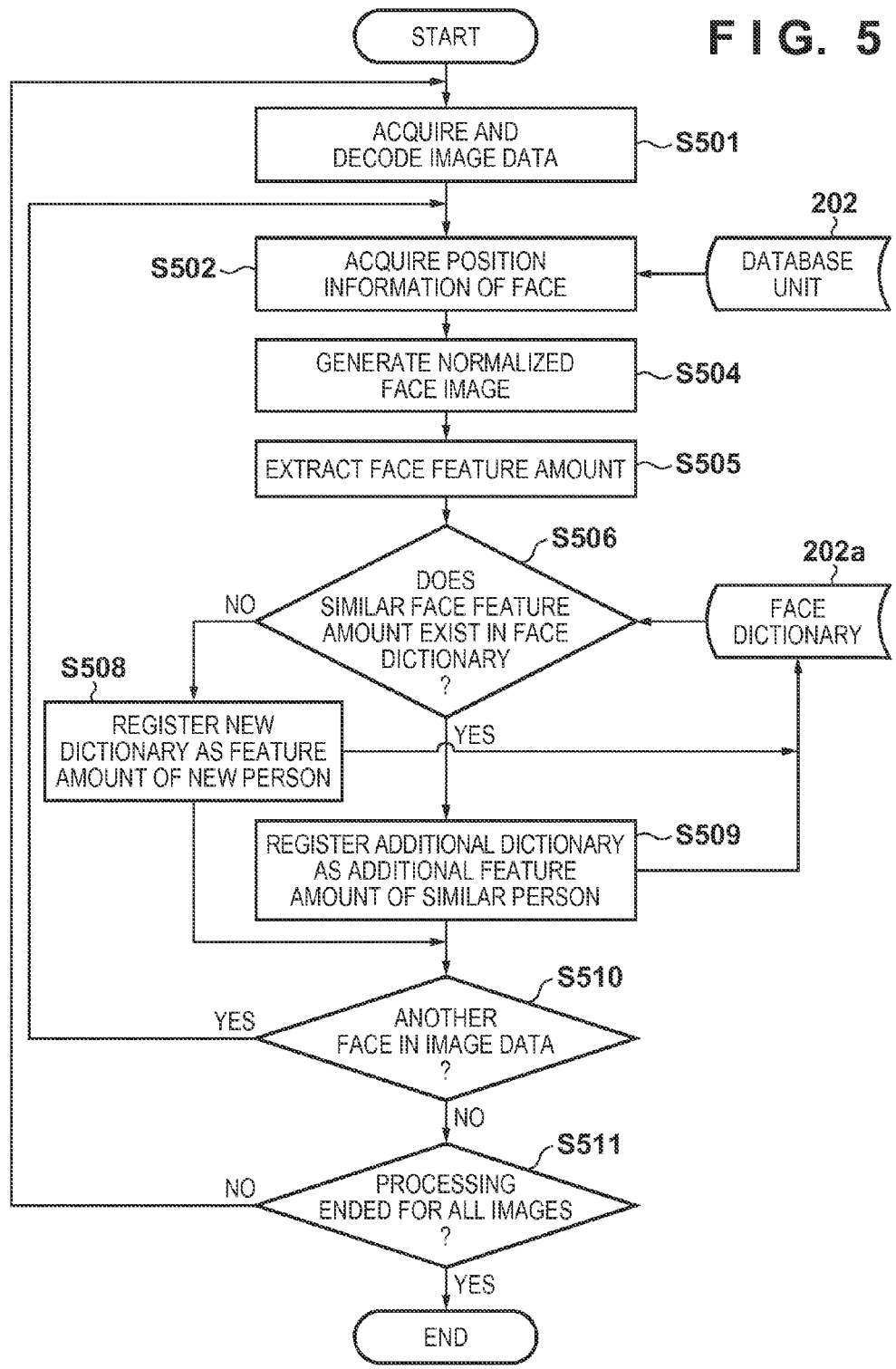
FIG. 5 is a flowchart of person group generation processing.

FIG. 5 illustrates the procedure of person group generation processing of grouping face information supposed to be of the same person based on detected face position information.

Figure 6:
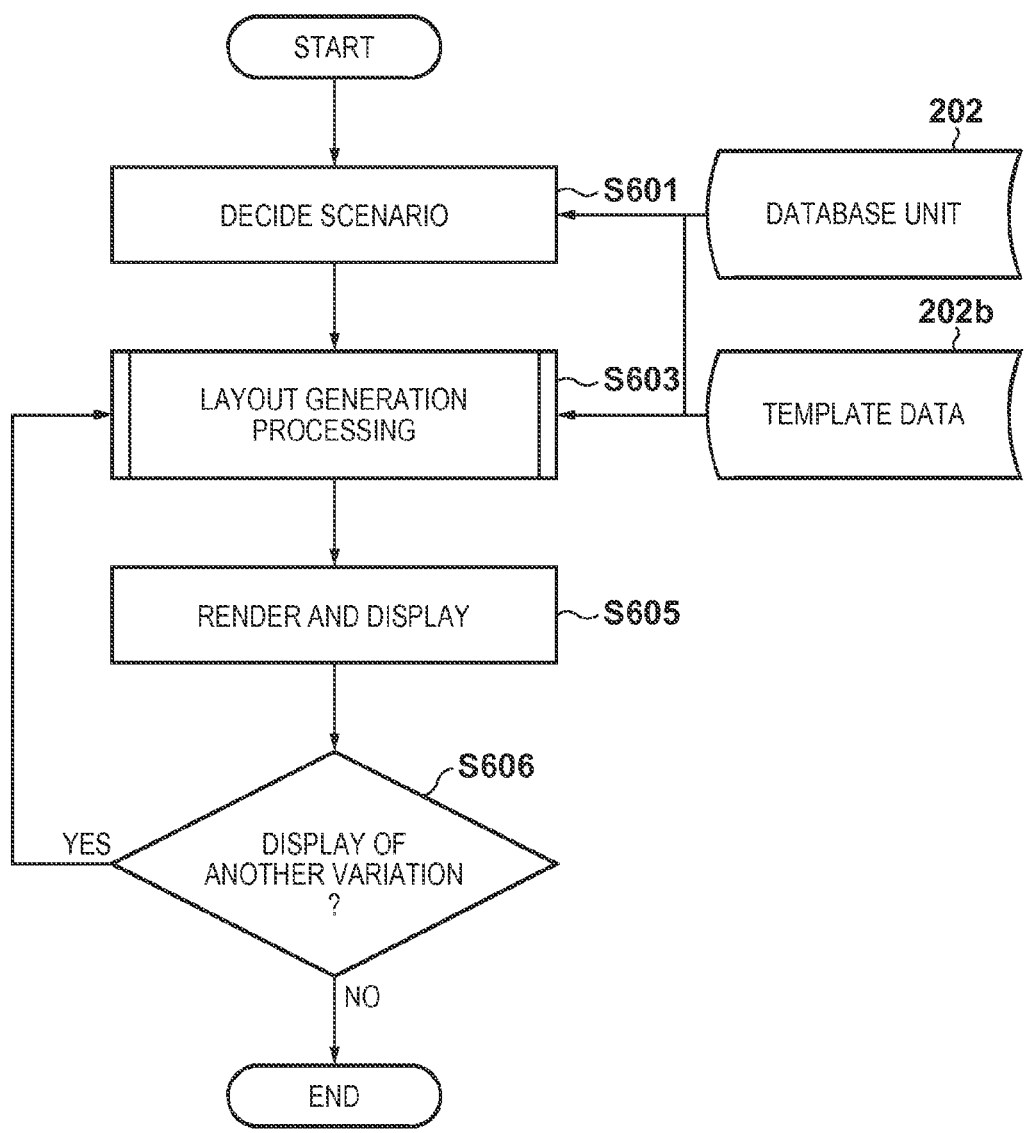
FIG. 6 is a flowchart of automatic layout proposal processing.

FIG. 6 illustrates the procedure of processing of deciding a scenario for layout creation based on the analysis information of an image and various kinds of information input by the user and automatically generating a layout based on the scenario.

In step S301 of FIG. 3, an image data group is acquired. As for the image data group, for example, the user connects an image capturing apparatus or memory card storing captured images to the hardware 115, thereby loading the captured images. Alternatively, images captured by the internal image capturing device 106 and saved in the secondary storage device 103 may be acquired as the image data group. Otherwise, the image data group may be acquired from an apparatus other than the information processing apparatus 115, for example, the external server 114 connected to the Internet via the wireless LAN 109.

Figure 8:
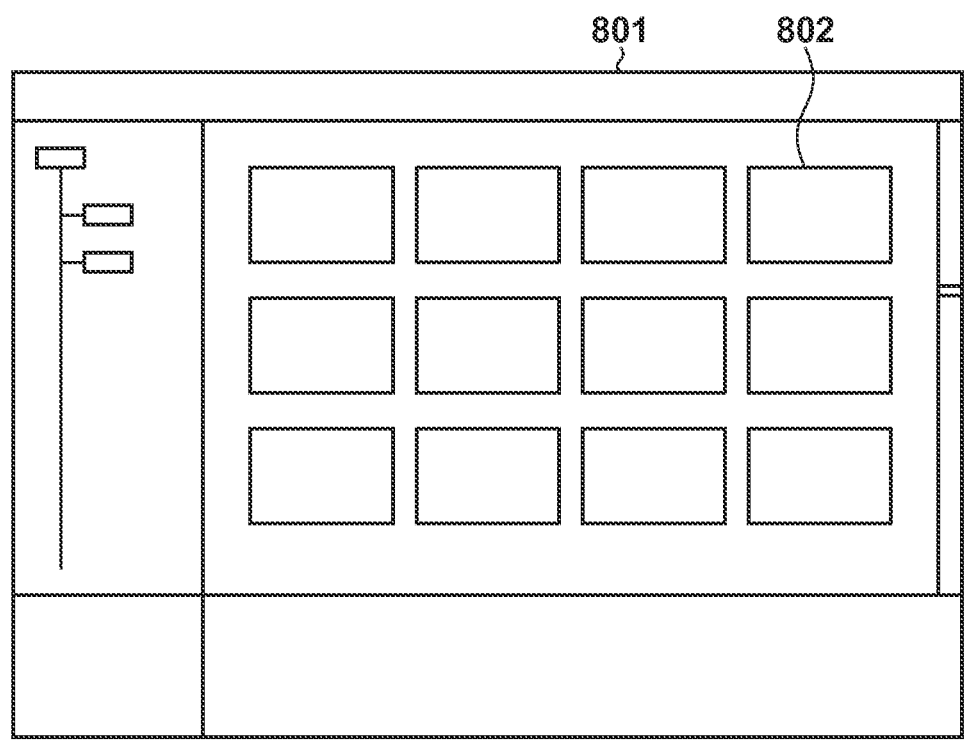
FIG. 8 is a view showing a display example of an image group in a thumbnail format.
Figure 9:
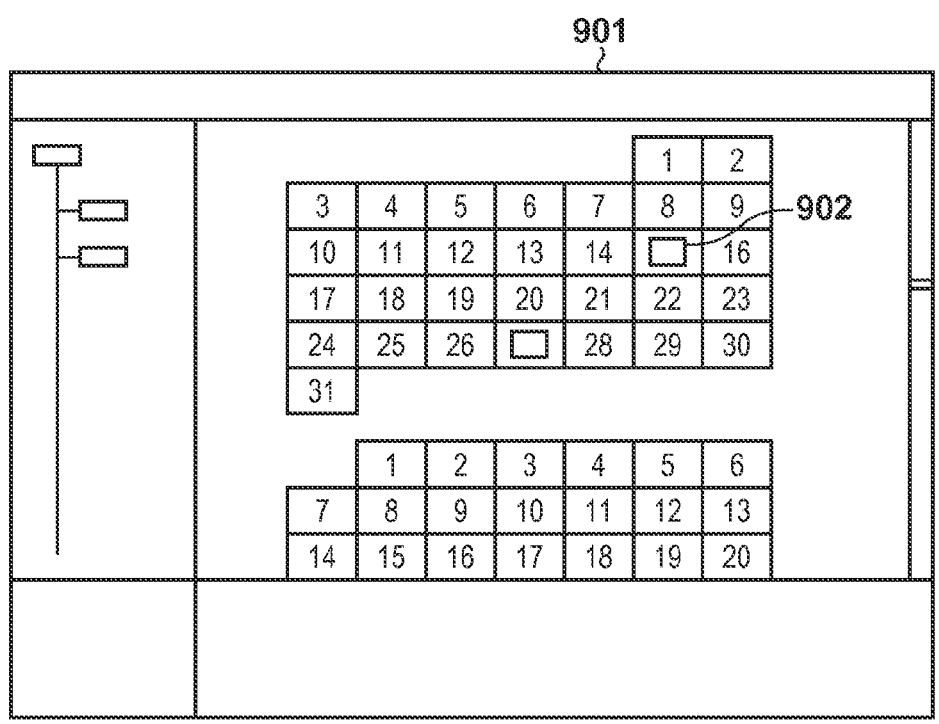
FIG. 9 is a view showing a display example of an image group in a calendar format.

Display on the display device 104 upon acquiring the image data group will be described here with reference to FIGS. 8 and 9. When an image data group is acquired, a thumbnail group is displayed on a UI, as shown in FIG. 8 or 9. Thumbnails 802 of the images may be displayed for each folder in the secondary storage device 103, as indicated by 801 in FIG. 8. Alternatively, the images may be managed for each date of a calendar on a UI 901, as shown in FIG. 9. In the UI 901 of FIG. 9, when the user clicks on a date portion 902, images captured that day are displayed in a thumbnail list, as shown in FIG. 8.

In steps S302 to S305, analysis processing and analysis result database registration are performed for each acquired image data group.

That is, in step S302, the application searches for an image newly saved and yet to undergo sensing processing. The codec unit converts (decodes) each extracted image from compressed data to bitmap data.

In step S303, various kinds of sensing processing are executed for the bitmap data. The sensing processing here indicates image analysis processing. In this embodiment, various kinds of image analysis processing shown in FIG. 10 are performed. In this embodiment, face detection reliability level, image feature amount analysis, and scene analysis are exemplified as the sensing processing. Results of data types as shown in FIG. 10 are calculated. In this embodiment, average luminance (int: value 0 to 255), average saturation (int: value 0 to 255), and average hue (int: value 0 to 359) are analyzed as the basic image feature amounts. In addition, the number of person's faces (int: value 0 or more (0 to MAXFACE)) and coordinate positions (int*8: value 0 or more (0 to Width or Height)) representing the position information of each person's face are analyzed as face detection. Furthermore, the average Y (int: value 0 to 255) in a face region, the average Cb (int: value −128 to 127) in a face region, and the average Cr (int: value −128 to 127) in a face region are analyzed. Note that in this embodiment, the object is the face of a person. However, the object may be the face of an animal such as a pet.

Each sensing processing will be explained below.

The average luminance and the average saturation of an entire image, which are the basic image feature amounts, can be obtained by a known method and will therefore be described briefly. For the average luminance, the R, G, and B components of each pixel of the image are converted into known luminance and color difference components (for example, Y, Cb, and Cr components), and the average value of the Y components is obtained. For the average saturation, the Cb and Cr components are calculated for each pixel, and the average value of S is obtained by $$S=\sqrt{Cb^2+Cr^2} \quad (1)$$

The average hue (AveH) in an image is a feature amount to evaluate the tone of the image. The hue of each pixel can be obtained using a known HIS conversion formula. The values are averaged in the entire image, thereby obtaining AveH.

The feature amounts may be calculated for the entire image. Alternatively, for example, the image may be divided into regions having a predetermined size, and the feature amounts may be calculated for each region.

Person's face detection processing will be described next. A known method is usable as the person's face detection method used in this embodiment. In Japanese Patent Laid-Open No. 2002-183731, first, an eye region is detected from an input image, and a region around the eye region is set as a face candidate region.

The luminance gradient and the weight of the luminance gradient are calculated for the face candidate region. These values are compared with the gradient and the gradient weight of a preset ideal reference face image. At this time, when the average angle between the gradients is equal to or smaller than a predetermined threshold, the input image is determined to have a face region.

According to Japanese Patent Laid-Open No. 2003-30667, a flesh color region is detected from an image. A human iris color pixel is then detected in the region, thereby detecting the position of an eye.

According to Japanese Patent Laid-Open No. 8-63597, the level of matching between an image and each of a plurality of templates of face shapes is calculated. A template having the highest matching level is selected. If the highest matching level is equal to or more than a predetermined threshold, the region on the selected template is set as a face candidate region. Using this template makes it possible to detect the position of an eye.

According to Japanese Patent Laid-Open No. 2000-105829, an entire image or a designated region of an image is scanned using a nose image pattern as a template. A position that matches the template most is output as the position of the nose. Next, a region above the nose position in the image is assumed to be a region where the eyes exist. The eye existence region is scanned using an eye image pattern as a template, and matching is calculated. An eye existence candidate position set that is a set of pixels whose matching levels are higher than a threshold is obtained. In addition, a continuous region included in the eye existence candidate position set is divided into clusters. The distance between each cluster and the nose position is calculated. A cluster having the shortest distance is decided to be a cluster including an eye, thereby detecting the organ position.

Figure 38:
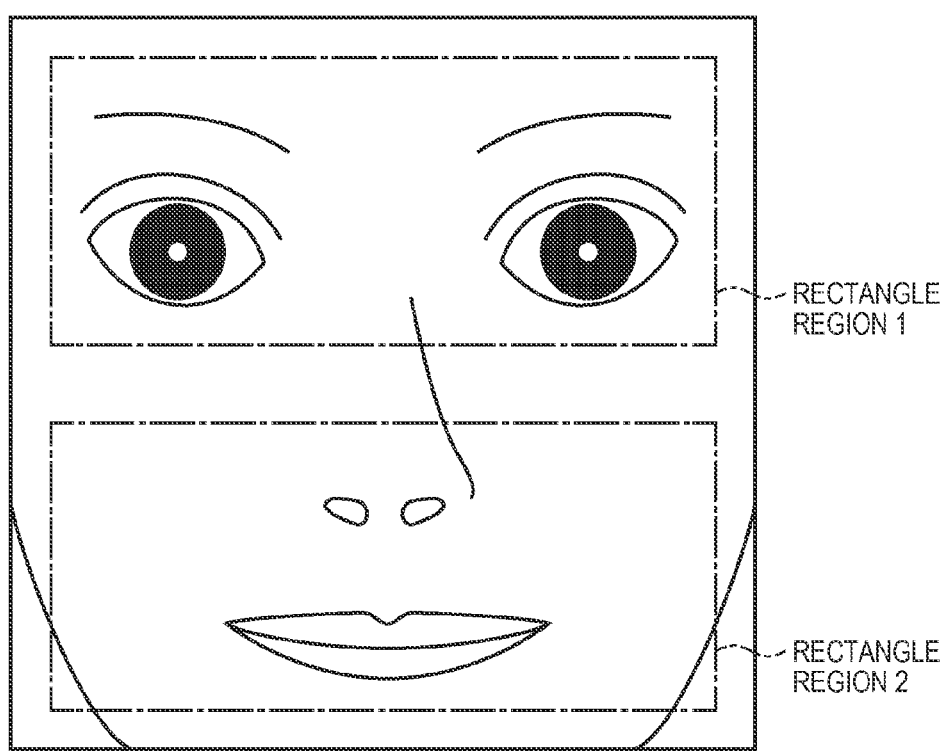
FIG. 38 is a view for explaining a face detection algorithm using AdaBoost.
Figure 39:
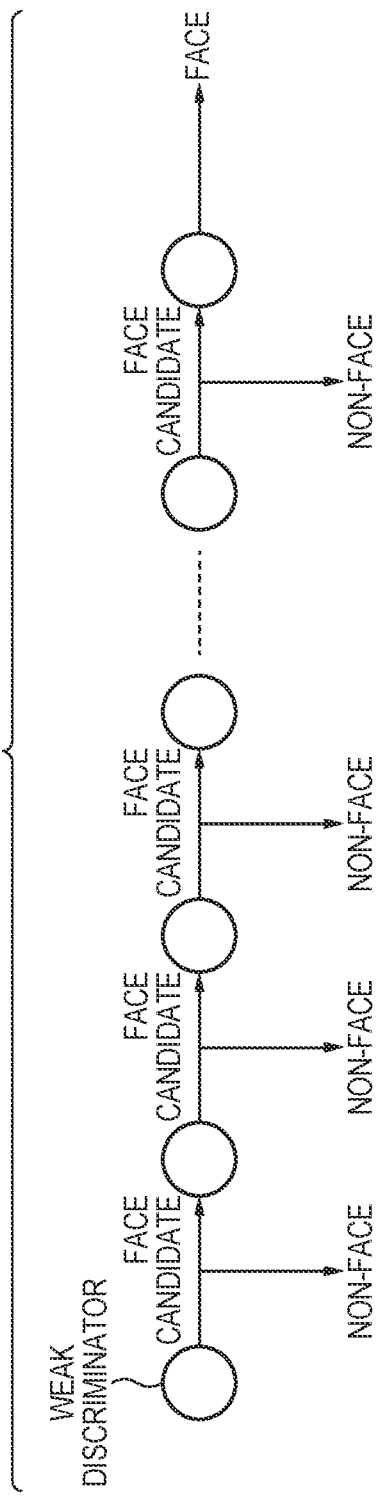
FIG. 39 is a view for explaining a face detection algorithm using AdaBoost.

According to Japanese Patent Laid-Open No. 2011-8704, the detection conditions at the time of detection are changed by applying a face detection algorithm using AdaBoost in accordance with the size of a face to be detected, thereby implementing high-speed detection processing. AdaBoost is a method of designing a strong discriminator by connecting a number of weak discriminators in series. A Haar type rectangle feature amount is set for each weak discriminator. For the descriptive convenience, settings are done here to make one weak discriminator analyze rectangle regions at two portions, as shown in FIG. 38. The weak discriminator analyzes the rectangle feature amount of each rectangle region. If the relationship of the feature amount is the same as a result obtained by learning in advance, an evaluation value is added. The rectangle feature amount to be analyzed changes between the weak discriminators. The weak discriminators are connected in series, as shown in FIG. 39, thereby implementing one strong discriminator (that is, detector). Processing is aborted when the additional evaluation value obtained by adding the evaluation values of the respective rectangle regions by the weak discriminators has become equal to or smaller than a set threshold, thereby speeding up the processing. When all the weak discriminators have finally determined a rectangle region as a face candidate, the region specified by the rectangle region is determined as a face region and output.

Other examples of the method of detecting a face and organ positions are Japanese Patent Laid-Open Nos. 8-77334, 2001-216515, 5-197793, 11-53525, 2000-132688, 2000-235648, and 11-250267, and Japanese Patent No. 2541688. In this embodiment, the method is not particularly limited.

As a result of the above-described processing, the number of human faces and the coordinate positions of each face can be acquired.

Additionally, a face reliability level is stored for each detected face. The face reliability level is, for example, a value defined by each of the various face detection methods as described above. The higher the face reliability level is, the higher the possibility that the detected object is a face is. However, if the face reliability level to detect a face is set low, the possibility that an object that is not a face is detected becomes high. That is, when the face reliability level to detect a face is set low, the detection tolerance widens. Note that, for example, in AdaBoost that is a face detection algorithm described in Japanese Patent Laid-Open No. 2011-8704, the final value of the additional evaluation value obtained by adding the evaluation values of the respective rectangle regions is used as the face reliability level.

In FIG. 10, the face reliability levels are stored as scores of 0 to 100. A detected object scoring 0 is a face at a low possibility. A detected object scoring 100 is a face at a very high possibility. Once face coordinate positions in an image are known, the average luminance and the average color difference of the face region can be obtained by calculating, for each face region, the average Y, Cb, and Cr values of pixel values included in the face region.

Scene analysis processing can be performed using the feature amount of an image. For the scene analysis processing, a technique disclosed in, for example, Japanese Patent Laid-Open No. 2010-251999 disclosed by the present applicant or Japanese Patent Laid-Open No. 2010-273144 may be used. Note that a detailed description of these techniques will be omitted here. The scene analysis can acquire an ID to distinguish the capturing scene such as Landscape, Nightscape, Portrait, Underexposure, and Others.

Note that the sensing information is not limited to that acquired by the above-described sensing processing, and any other sensing information may be used.

The sensing information acquired in the above-described manner is saved in the database 202.

The saving format in the database is not particularly limited. The sensing information is described using, for example, a general-purpose format (for example, XML: eXtensible Markup Language) as shown in FIG. 11 and stored.

FIG. 11 shows an example in which the attribute information of each image is classified into three categories and described. The first BaseInfo tag is information added to an acquired image file in advance and representing the image size and capturing time information. This tag includes the identifier ID of each image, the save location where the image file is stored, the image size, and the capturing date/time.

The second SensInfo tag is used to store the result of the above-described image analysis processing. The average luminance, average saturation, and average hue of the entire image and the scene analysis result are stored. In addition, information associated with the face position and face color of each person existing in the image can be described. The above-described face reliability level is also described here. For example, the "<Weight>60</Weight>" portion in FIG. 11 indicates that the face reliability level is 60.

The third UserInfo tag can store information input by the user for each image. Details will be described later. Note that the method of storing image attribute information in the database is not limited to that described above, and any other known format is usable.

Next, in step S306 of FIG. 3, processing of generating a group for each person using the face position information detected in step S303 is performed. Automatically grouping person's faces in advance makes it possible to increase the efficiency of the user's operation of naming each person later.

This person group formation is executed using a known personal recognition technique in accordance with a processing procedure shown in FIG. 5.

Note that the personal recognition technique mainly includes two techniques, that is, extracting the feature of an organ such as an eye or a mouth existing in a face and comparing the similarities of the relationships. As the personal recognition technique, a known method is usable. For example, a technique disclosed in Japanese Patent No. 3469031 can be used.

FIG. 5 is a basic flowchart of the person group generation processing of step S306.

In step S501, the images saved in the secondary storage device are sequentially read out and decoded. In step S502, the database 202 is accessed, and the number of faces included in each image and the position information of each face are acquired. In step S504, normalized face images to be used for personal recognition processing are generated.

The normalized face images are face images obtained by extracting faces existing in the images with various sizes, orientations, and resolutions and converting them into faces having a predetermined size and orientation. Since the positions of organs such as an eye and a mouth are important in personal recognition, each normalized face image preferably has such a size that makes it possible to reliably recognize the organs. When the normalized face images are prepared, it is unnecessary to cope with faces of various resolutions in the feature amount extraction processing.

In step S505, face feature amounts are extracted from the normalized face image. In this case, as a characteristic feature, the face feature amounts include the positions and sizes of organs such as an eye, mouth, and nose and the outline of the face.

In step S506, it is determined whether the face feature amounts are similar to face feature amounts in a database 202a (to be referred to as a face dictionary hereinafter) that stores face feature amounts prepared for each person identifier (ID) in advance. If the determination ends with "YES", the face is determined to belong to the same person and added to the dictionary ID of that person in step S509.

If the determination of step S506 ends with "NO", the current evaluation target face is determined to belong to a person different from those registered in the face dictionary so far. Hence, a new person ID is issued, and the face is added to the face dictionary 202a. In step S511, it is determined whether the processes of steps S502 to S509 have ended for all images. If the processes have ended for all images, the processing ends. If the processes have not ended for all images, the process returns to step S502. That is, the processes of steps S502 to S509 are applied to all face regions detected from the input image group, and the appearing persons are grouped.

The grouping result is described using an ID tag for each face, as shown in the XML format of FIG. 16, and saved in the above-described database 202.

Note that in the above-described embodiment, the person group generation processing is executed after the sensing processing of all images, as shown in FIG. 3. However, any other method is usable. For example, as shown in FIG. 4, the sensing processing is executed for all images in step S403. After that, the grouping processing is performed in step S405 using face detection position information. All image data may be processed by repeating this processing.

Figure 7:
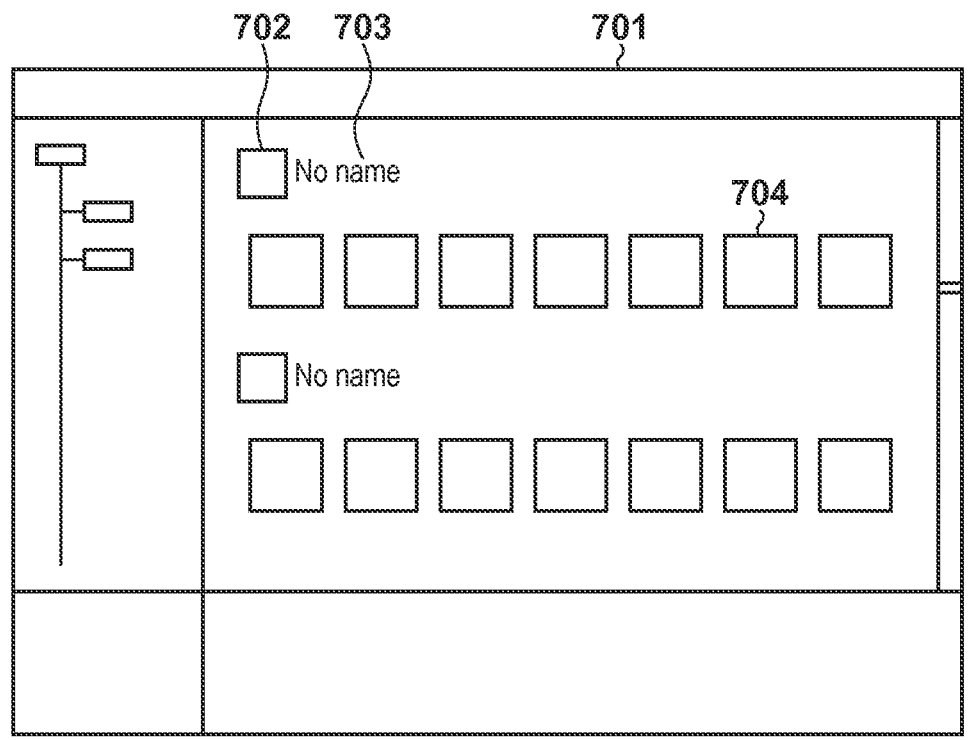
FIG. 7 is a view showing a display example of person groups.

Each person group obtained by the above-described processing is displayed using a UI 701 as shown in FIG. 7. Referring to FIG. 7, reference numeral 702 denotes a representative face image of a person group. A region 703 to display the name of the person group exists on a side. Immediately after the automatic person grouping processing, "No name" is displayed as the person name in the region 703, as shown in FIG. 7. Reference numeral 704 denotes a plurality of face images included in the person group. In the UI shown in FIG. 7, a person name can be input by designating the "No name" region 703, or information such as the birthday or family relationship can be input for each person, as will be described later.

The sensing processing may be executed using the background task of the operating system. In this case, the user can continue the sensing processing of the image group even when another operation is being performed on the computer.

In this embodiment, the user may manually input various kinds of attribute information about an image. Alternatively, various kinds of attribute information about an image may be set automatically.

FIG. 12 shows a list of examples of the attribute information (to be referred to as manually registered information hereinafter). The manually registered information is roughly divided into image attribute information set for each image and person attribute information set for each person grouped by the above-described processing.

Figure 13:
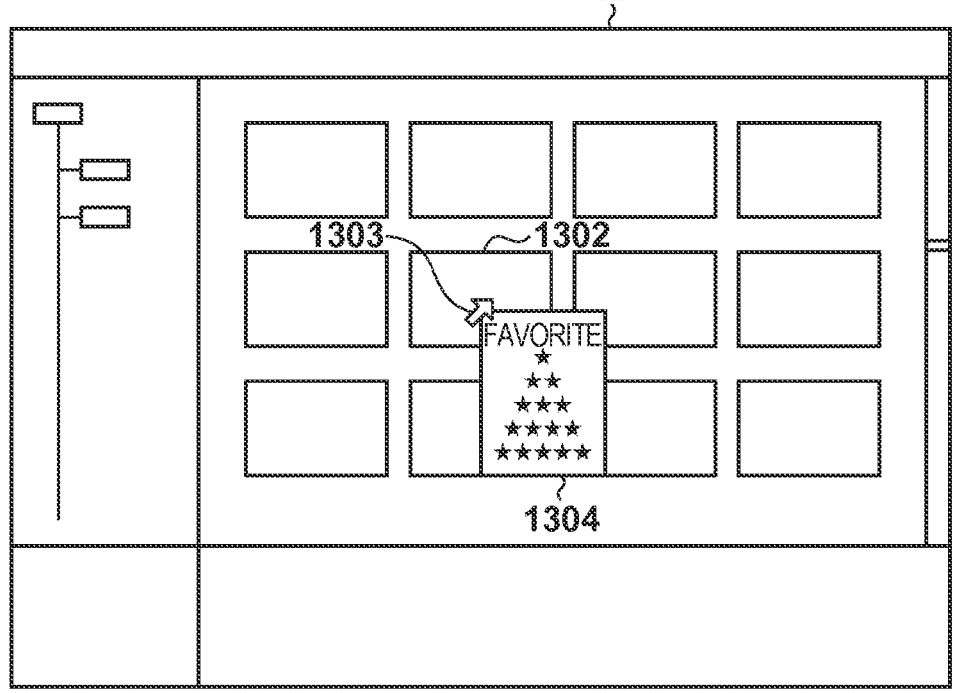
FIG. 13 is a view showing an example of a UI used to manually input the favorite rate.

An example of the image attribute information set for each image is the favorite rate of the user. The user can manually input the favorite rate representing whether the user likes the image. For example, as shown in FIG. 13, the user selects a desired thumbnail 1302 image on a UI 1301 by a pointer 1303 and clicks the right bottom of the mouse, thereby displaying a dialogue capable of inputting the favorite rate. The user can select the number of star symbols in the menu in accordance with his/her taste. In this embodiment, setting is done such that the higher the favorite rate is, the larger the number of star symbols is.

The favorite rate may be set automatically, instead of causing the user to manually input. For example, the user's viewing count may automatically be set as the favorite rate. Assume that the user clicks on a desired image file in the state shown in FIG. 8 in which the thumbnail image list is displayed to transit to a single image display screen. The transition count may be measured, and the favorite rate may be set in accordance with the count. That is, it is judged that the larger the viewing count is, the more the user likes the image.

As another example, the favorite rate may automatically be set in accordance with the printing count. For example, when a print action is taken, it is judged that the user likes the image, as a matter of course. The favorite rate is judged to be higher by measuring the printing count.

As described above, the favorite rate is manually set by the user or automatically set based on the viewing count or printing count. The above-described attributes are individually stored in the Userinfo tag of the database 202 using the XML format as shown in FIG. 11. For example, the favorite rate is represented by a FavoriteRate tag, the viewing count is represented by a ViewingTimes tag, and the printing count is represented by a PrintingTimes tag.

Another attribute information set for each image is event information. Examples of the event information are "travel", "graduation", and "wedding".

Figure 14:
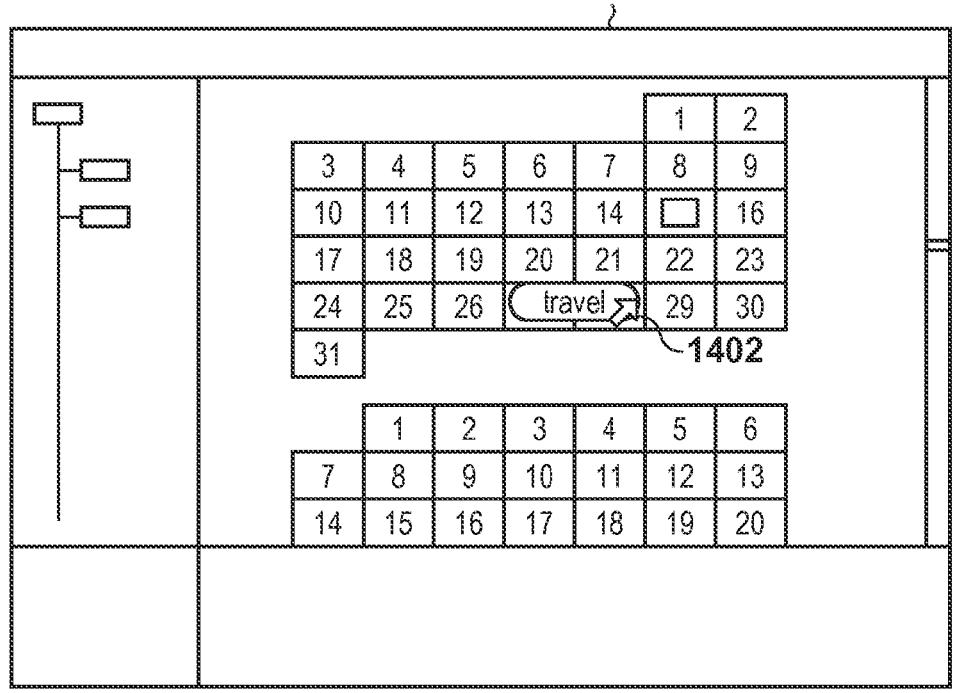
FIG. 14 is a view showing an example of a UI used to manually input event information.

To designate the event, for example, as shown in FIG. 14, a desired date may be designated on a calendar using a pointer 1402 or the like, and the name of the event on that day may be input to set the event. The designated event name is included in the XML format shown in FIG. 11 as part of the image attribute information. In the form shown in FIG. 11, the event name and the image are associated (linked) with each other using an Event tag in the UserInfo tag.

Person attribute information that is another manually registered information will be described next.

FIG. 15 shows a UI used to input person attribute information. Referring to FIG. 15, reference numeral 1502 denotes a representative face image of a predetermined person (in this case, "father"). In addition, 1504 displays a list of images detected from other images and judged to have similar face feature amounts in step S506.

After the sensing processing, no name is input for each person group, as shown in FIG. 7. However, an arbitrary person name can be input by designating the "No name" portion 703 by a pointer.

As an attribute of each person, the birthday of the person or the family relationship viewed from the user who is operating the application can also be set. When clicking on the representative face 1502 of the person shown in FIG. 15, the user can input the birthday of the clicked person using a first input portion 1505, as illustrated on the lower side of FIG. 15, and can also input family relationship information using a second input portion 1506.

Unlike the above-described image attribute information linked with the images, the input person attribute information is managed in the database 202 separately from the image attribute information using the XML format as shown in FIG. 16.

Figure 17:
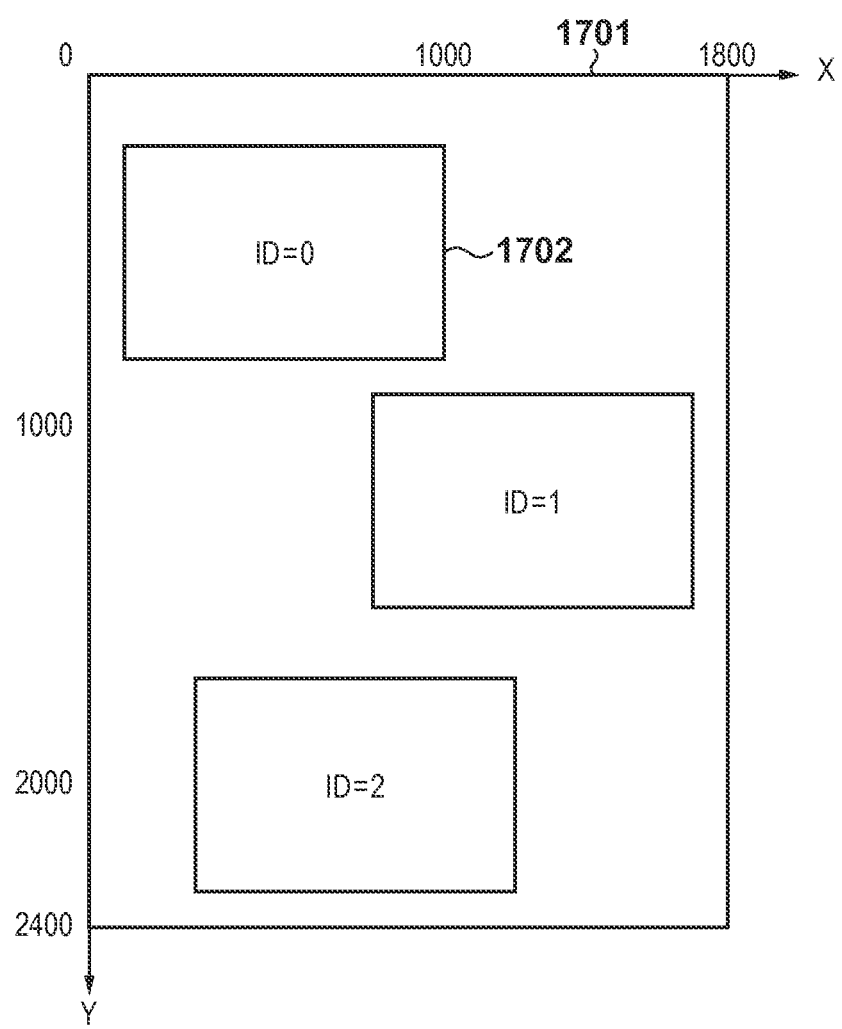
FIG. 17 is a view showing an example of a layout template.
Figure 19:
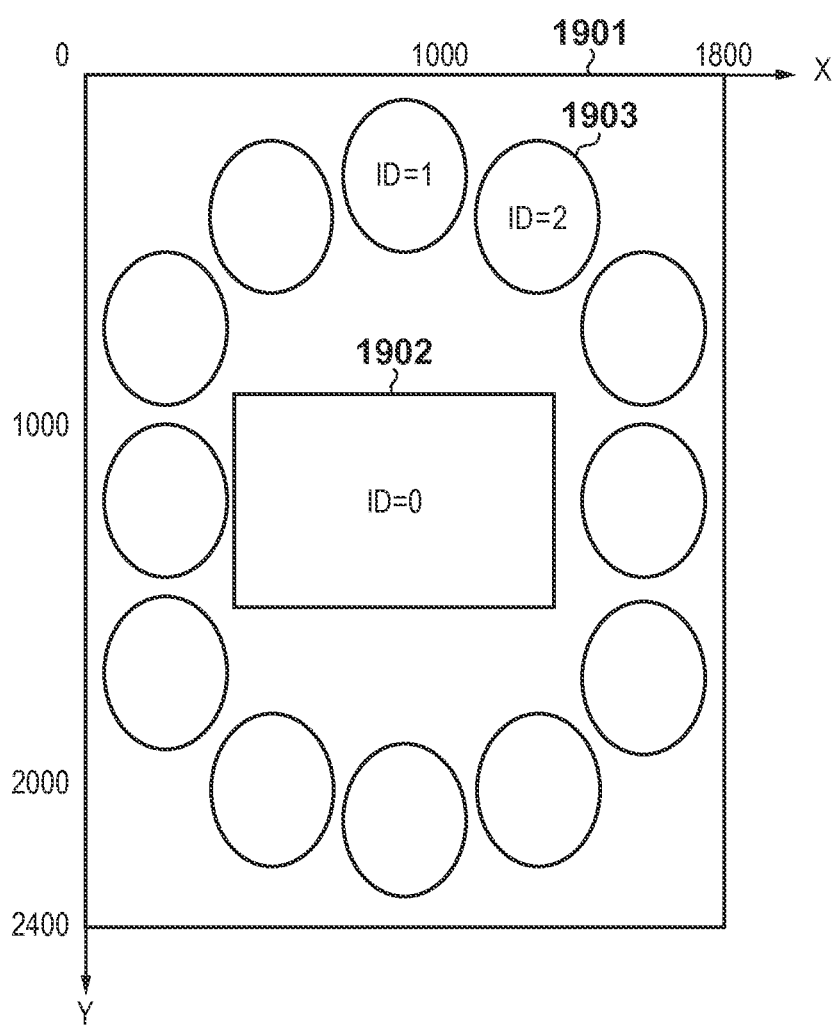
FIG. 19 is a view showing an example of a layout template.

In this embodiment, various layout templates are prepared in advance. Examples of the layout templates are shown in FIGS. 17 and 19. Each layout template includes a plurality of image arrangement frames 1702 or 1902 (to be synonymous with slots hereinafter) on a paper size to lay out images.

Such templates are saved in the secondary storage device in advance when the software to execute the embodiment is installed in the information processing apparatus 115. As another method, an arbitrary template may be acquired from the server 114 existing on the Internet connected via the IF 107 or the wireless LAN 109.

These templates are assumed to be described in a highly versatile structured language, for example, XML like the above-described sensing result storage. FIGS. 18 and 20 show examples of XML data. In FIGS. 18 and 20, first, a BASIC tag describes the basic information of the layout page. The basic information includes, for example, the theme of the layout, the page size, and the page resolution (dpi). Referring to FIGS. 18 and 20, a Theme tag representing the layout theme is blank in the initial state of the template. As the basic information, the page size is set to A4, and the resolution is set to 300 dpi.

Subsequently, information of each of the above-described image arrangement frames is described by an ImageSlot tag. The ImageSlot tag holds two tags, that is, an ID tag and a POSITION tag to describe the ID and position of the image arrangement frame. The position information is defined on, for example, an X-Y coordinate system having its origin at the upper left corner, as shown in FIG. 17 or 19.

The ImageSlot can also set, for each slot, the shape of the slot and the name of the recommended person group to be arranged.

For example, in the template shown in FIG. 17, all slots have the "rectangle" shape, as indicated by the Shape tag in FIG. 18. As for the person group name, arranging "Main-Group" is recommended by the "PersonGroup" tag.

In addition, in the template shown in FIG. 19, the slot with ID=0 arranged at the center is described as a slot having the rectangle shape, as shown in FIG. 20. As for the person group, arranging "SubGroup" is recommended. The subsequent slots with ID=1, 2, . . . , have the ellipse shape. Arranging "MainGroup" as the person group is recommended.

In this embodiment, holding a number of such templates is recommended.

As described above, the application presented in this embodiment can execute analysis processing for an input image group, automatically group persons, and display them on a UI. Viewing the result, the user can input attribute information such as a name and birthday for each person group and set the favorite rate or the like for each image.

It is also possible to hold a number of layout templates classified by the theme.

When the above-described conditions are satisfied, the application of this embodiment performs, at a predetermined timing, processing of automatically generating a collage layout the user is likely to be fond of and presenting it to the user. This will be referred to as layout proposal processing hereinafter.

FIG. 6 is a basic flowchart to perform layout proposal processing.

Referring to FIG. 6, in step S601, the scenario of proposal processing is decided. The scenario includes the theme of the layout to be proposed, decision of a template, settings of a person (main character) to be emphasized in the layout, and selection information of an image group to be used for layout generation.

Examples of two scenarios will be described below for the sake of simplicity.

For example, assume that setting is done in advance so as to automatically generate and present a collage layout two weeks before the birthday of each person. Also assume that the first birthday of the person "son" automatically grouped in FIG. 15 comes after two weeks. In this case, the theme of the layout to be proposed is decided as "growth". Next, a template is selected. In this case, a template as shown in FIG. 19 suitable for "growth" is selected, and "growth" is described in the Theme tag portion of XML, as shown in FIG. 30. Next, "son" is set as the main character "Main-Group" on which focus is placed at the time of layout. Then, "son" and "father" are set as "SubGroup" on which focus is secondarily placed at the time of layout. An image group to be used for layout is selected. In this example, the database 202 is referred, and an enormous number of images including "son" are extracted and listed out of the images captured so far from the birthday of the person "son". The scenario decision for the growth layout has been described.

As an example different from that described above, assume that setting is done in advance so as to automatically generate and present a collage layout when there are travel photos captured within one month. Upon knowing, based on the event information registered in FIG. 14, that the family traveled several days ago, and an enormous number of images of the travel are saved in the secondary storage device, the scenario decision unit decides a scenario to propose a travel layout. In this case, the theme of the layout to be proposed is decided as "travel". Next, a template is selected. In this case, a layout as shown in FIG. 17 is selected, and "travel" is described in the Theme tag portion of XML, as shown in FIG. 31. Then, "son", "mother", and "father" are set as the main character "MainGroup" on which focus is placed at the time of layout. In this way, a plurality of persons can be set as "MainGroup" by taking advantage of the characteristics of XML. Next, an image group to be used for layout is selected. In this example, the database 202 is referred, and an enormous number of images linked with the travel event are extracted and listed. The scenario decision for the travel layout has been described.

Figure 21:
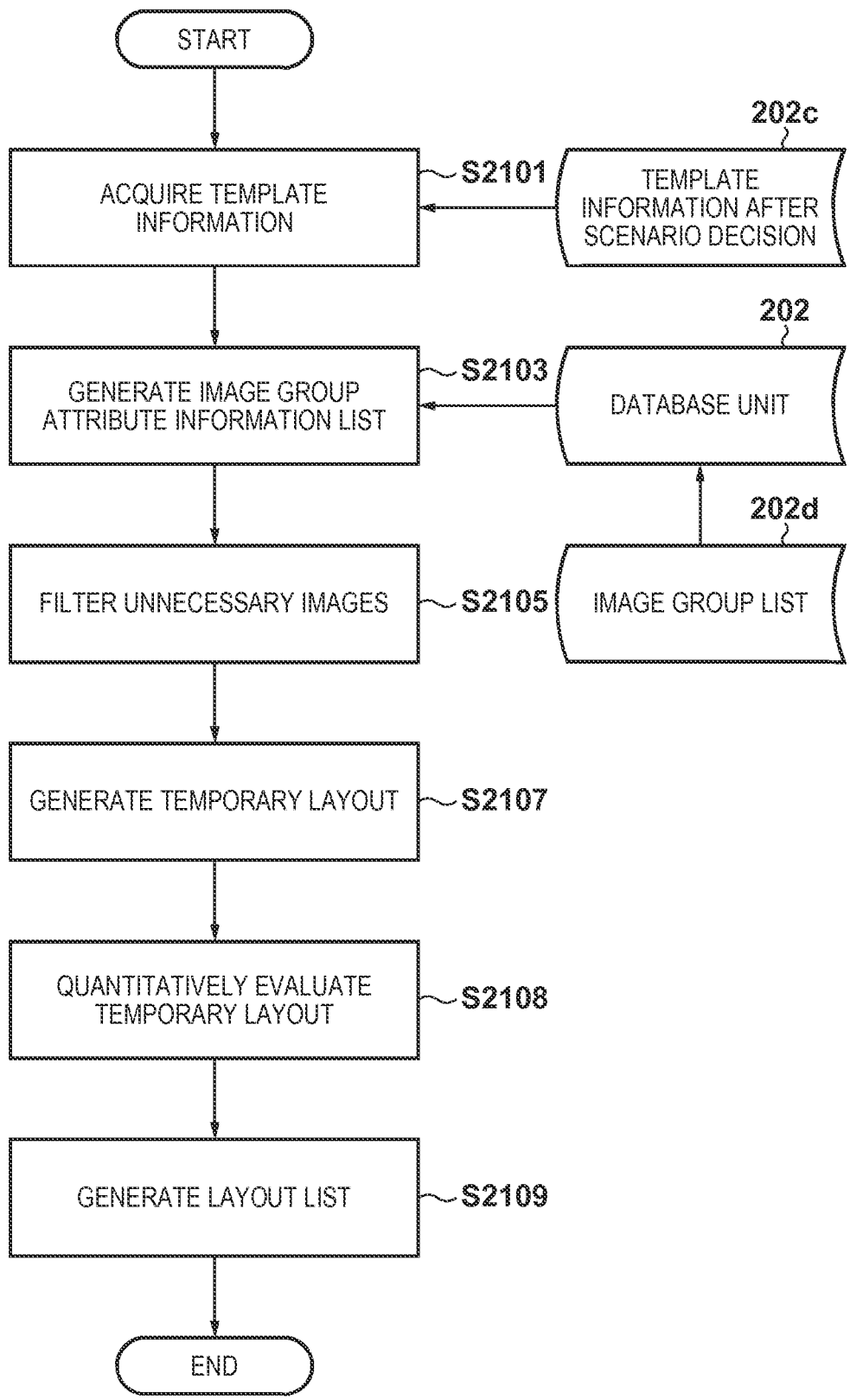
FIG. 21 is a flowchart of automatic layout proposal processing according to the first embodiment.

Next, in step S603 of FIG. 6, automatic layout generation processing based on the above-described scenario is executed. The automatic layout generation processing based on the scenario will be described here with reference to FIG. 21. FIG. 21 illustrates the detailed processing procedure of the layout processing unit.

Referring to FIG. 21, in step S2101, layout template information after the scenario is decided by the above-described scenario generation processing and the layout theme and the person group information are set is acquired from a database 202c.

In step S2103, the feature amounts of each image are acquired from the database 202 based on an image group list 202d decided by the scenario, and an image group attribute information list is generated. The image group attribute information list has a structure in which the IMAGEINFO tags shown in FIG. 11 are arranged as many as the number of image lists. The automatic layout generation processing in steps S2105 to S2109 is performed based on the image group attribute information list.

As described above, in the automatic layout generation processing of this embodiment, attribute information saved in the database in advance by performing sensing processing for each image is used, instead of directly handling the image data itself. This is because if the image data itself is used when performing the layout generation processing, a very large memory area is necessary for storing the image group. That is, using the attribute information stored in the database 202, as in this embodiment, makes it possible to reduce the utilization of the memory area.

Figure 22:
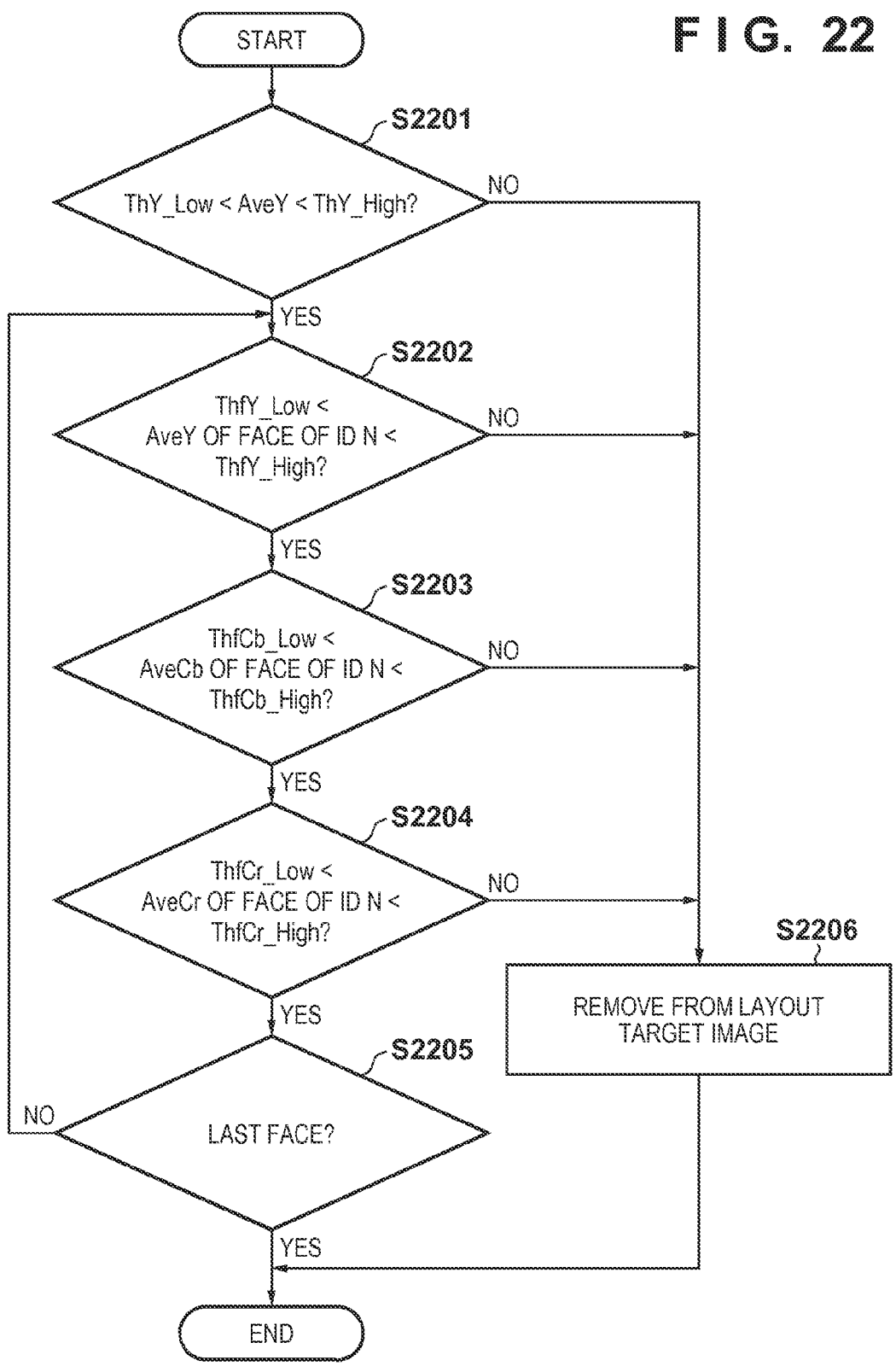
FIG. 22 is a flowchart of unnecessary image filtering processing according to the first embodiment.
Figure 23:
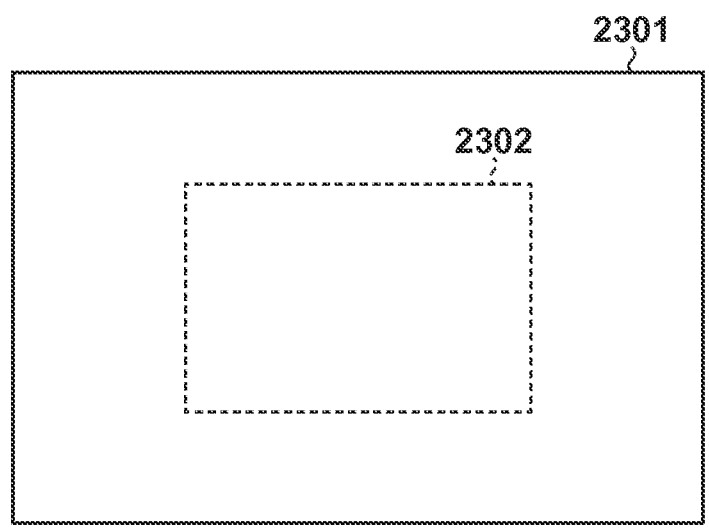
FIG. 23 is a view showing an example of automatic trimming processing.

In step S2105, unnecessary images are filtered from the input image group using the attribute information of the input image group. The filtering processing is performed in accordance with the procedure shown in FIG. 22. Referring to FIG. 22, in step S2201, it is determined for each image whether the average luminance value (AveY) of the entire image falls within the range of predetermined thresholds (ThY_Low and ThY_High). If NO, the process advances to step S2206 to remove the image of interest from the layout target. The filtering processing will be described here with reference to FIG. 22.

Similarly, in steps S2202 to S2205, whether the average luminance and average color difference components fall within the ranges of predetermined thresholds representing a satisfactory flesh color region is determined for each face region included in the image of interest. Only an image for which all determinations of steps S2202 to S2205 end with "YES" is applied to the subsequent layout generation processing. More specifically, in step S2202, it is determined whether AveY of a face region with ID=N falls within the range of predetermined thresholds (ThfY_Low and ThfY_High). In step S2203, it is determined whether AveCb of the face region with ID=N falls within the range of predetermined thresholds (ThfCb_Low and ThfCb_High). In step S2204, it is determined whether AveCr of the face region with ID=N falls within the range of predetermined thresholds (ThfCr_Low and ThfCr_High). In step S2205, it is determined whether the face is the last face. If the face is not the last face, the process returns to step S2202. If the face is the last face, the processing ends.

Note that since this filtering processing aims at removing images that can obviously be judged as unnecessary for the subsequent temporary layout creation processing, the thresholds are preferably set relatively leniently. For example, in the overall image luminance determination of step S2201, if the difference between ThY_High and ThY_Low is excessively smaller than the image dynamic range, the number of images determined as "YES" accordingly decreases. Hence, in the filtering processing of this embodiment, the difference between the thresholds is set as large as possible. In addition, thresholds that can remove an image that is obviously judged as an abnormal image are set.

Next, in step S2107 of FIG. 21, an enormous number of (L) temporary layouts are generated using the image group determined as the layout target by the above-described processing. Temporary layout generation is executed by repeating processing of arbitrarily applying an input image to an image arrangement frame of the acquired template. At this time, the following parameters (image selection/arrangement/trimming criterion) are decided at random.

The image selection defines, for example, an image which should be selected from the image group when N image arrangement frames exist in the layout. The image arrangement defines, for example, arrangement frames in which a plurality of selected images should be arranged. The trimming criterion defines a trimming ratio representing the degree of trimming processing to be performed for an arranged image.

The trimming ratio is represented by, for example, 0% to 100%. An image is trimmed using a certain position in the image as the reference. The certain position in the image is, for example, the position of a face detected by image analysis, which is located near the coordinates described in the <Position> portion in FIG. 11. If a plurality of faces are detected in one image, trimming is performed such that all the faces (image regions represented by the face objects) are included. When cutting out one of a plurality of faces by trimming, a face of an ID for which many images are registered in correspondence with the same person ID, a face of an ID for which a person name is registered by the user, or a face of a high face reliability level is cut out by trimming.

Based on the above-described image selection/arrangement/trimming criterion, temporary layouts are generated as many as possible. The generated temporary layouts can be expressed by XML, as shown in FIG. 32. The ID of the image selected and arranged in each slot is described by the ImageID tag, and the trimming ratio is described by the TrimmingRatio tag.

Note that the number L of temporary layouts generated here is decided in accordance with the throughput of evaluation processing in a layout evaluation step to be described later and the performance of the information processing apparatus 115 that performs the processing. For example, several hundred thousand or more different temporary layouts are preferably prepared. Each generated layout can be saved together with an ID in the secondary storage device as a file using the XML format shown in FIG. 32, or stored on the RAM using another data structure such as a structure.

Next, in step S2108 of FIG. 21, the L temporary layouts created above are evaluated using predetermined layout evaluation amounts. FIG. 24 shows a list of layout evaluation amounts according to this embodiment. As shown in FIG. 24, the layout evaluation amounts used in this embodiment can mainly be divided into there categories.

Figure 25:
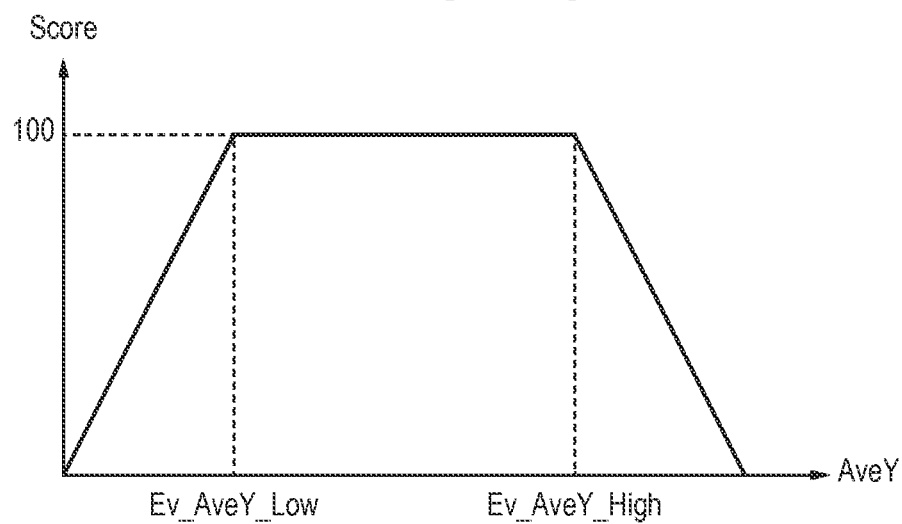
FIG. 25 is a graph for explaining a method of calculating brightness appropriateness.
Figure 26:
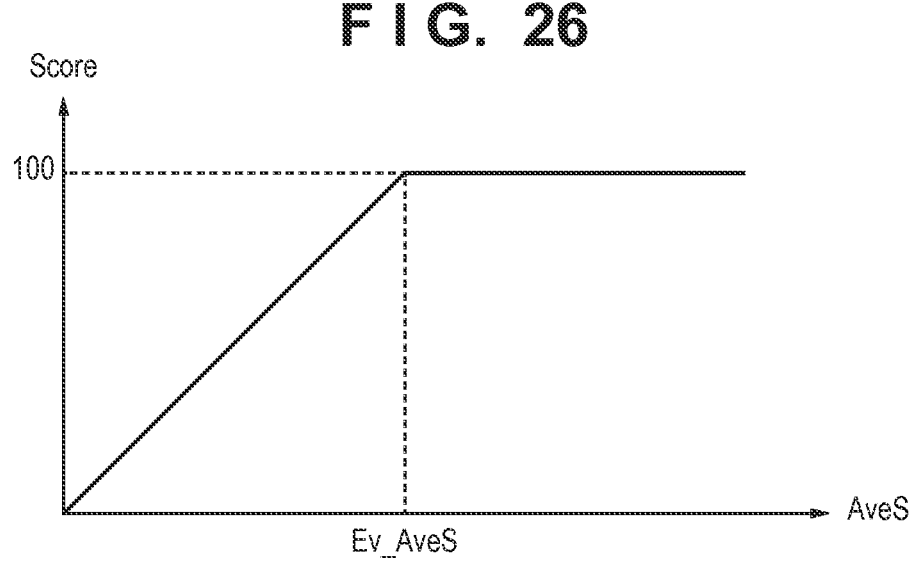
FIG. 26 is a graph for explaining a method of calculating saturation appropriateness.

The first evaluation category includes the evaluation amounts of each image. The evaluation amounts are used to judge states such as the brightness, saturation, and blur amount of an image and score the states. An example of scoring will be described below. The brightness appropriateness scores 100 when the average luminance falls within a predetermined range, as shown in FIG. 25. The score is set so as to be lower when the average luminance falls outside the predetermined threshold range. The saturation appropriateness scores 100 when the average saturation of the entire image is larger than a predetermined saturation value, as shown in FIG. 26. The score is set so as to gradually decrease when the average saturation is smaller than the predetermined value.

The second evaluation category scores evaluation of matching between an image and a slot. Examples of evaluation of the image/slot matching are person matching and trimming loss determination. The person matching represents the matching ratio of a person designated for a slot to a person who exists in the image actually arranged in the slot. For example, assume that "father" and "son" are designated for a slot as "PersonGroup" designated by XML. At this time, when the two persons are included in the image assigned to the slot, the person matching of the slot scores 100. If only one of the persons is included, the matching scores 50. If neither person is included, the matching scores 0. The matching in a page is the average value of the matchings calculated for the respective slots.

Figures 27, 28:
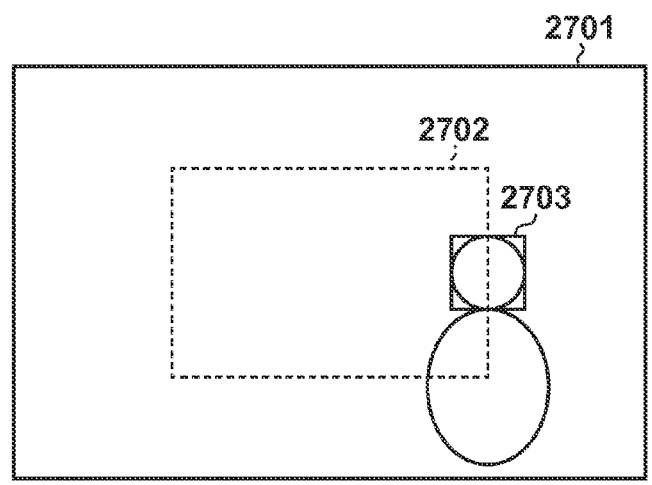
FIG. 27 is a view for explaining trimming loss determination processing.
FIG. 28 is a table for explaining image similarity determination processing.

Another image/slot matching evaluation value is loss determination of a trimming region 2702. For example, when a position 2703 of a face existing in an image is known, as shown in FIG. 27, scores of 0 to 100 are calculated in accordance with the area of the lost portion. If the area of the lost portion is 0, the score is 100. Conversely, if the whole face region is lost, the score is 0.

The third evaluation category evaluates the balance in a layout page. FIG. 24 shows image similarity, tone variation, and face size variation as the evaluation values used to evaluate the balance.

The image similarity will be described first. As the image similarity, the similarity between the images is calculated for each of the enormous number of generated temporary layouts. For example, if only similar images that resemble each other are arranged at the time of creating a layout of theme "travel", the layout may be not good. For example, the similarity can be evaluated by the capturing date/time. If the capturing dates/times of images are close, there is a high possibility that the images were captured at similar places. However, if the capturing dates/times are far off, both the scenes and the places are different at a high possibility. The capturing date/time can be acquired from the attribute information of each image, which is saved in the database 202 in advance as image attribute information, as shown in FIG. 11. To obtain the similarity from the capturing dates/times, the following calculation is performed. For example, assume that four images as shown in FIG. 28 are laid out in the temporary layout of interest. Note that in FIG. 28, capturing date/time information is added to each image specified by an image ID. More specifically, year/month/day and time (Christian Era year: YYYY, month: MM, day: DD, hour: HH, minute: MM, and second: SS) are added as a capturing date/time. At this time, the shortest capturing time interval between the four images is calculated. In this case, the time interval of 30 min between image ID "102" and image ID "108" is the shortest. This interval is set as MinInterval and stored in seconds. That is, 30 min=1800 sec. The MinInterval is calculated for each of the L temporary layouts and stored in an array stMinInterval[l]. A maximum value MaxMinInterval in stMinInterval[l] is obtained. A similarity evaluation value Similarity[l] of the lth temporary layout can be obtained by Similarity[$l$]=100×stMinInterval[$l$]/MaxMinInterval (2)

That is, Similarity[l] is effective as the image similarity evaluation value because it is close to 100 as the minimum capturing time interval becomes large, and close to 0 as the time interval becomes small.

The tone variation will be explained next as the evaluation value used to evaluate the balance in a layout page. For example, if only images of similar colors (for example, blue of a blue sky, green of a mountain) are arranged at the time of creating a layout of theme "travel", the layout may be not good. In this case, the tone variation is set large. In that case, the variance of the average hues AveH of images existing in the lth temporary layout of interest is calculated and stored as a hue variation tmpColorVariance[l]. A maximum value MaxColorVariance in tmpColorVariance[l] is obtained. A color variation evaluation value ColorVariance[l] of the lth temporary layout can be obtained by ColorVariance[$l$]=100×tmpColorVariance[$l$]/MaxColorVariance (3)

That is, ColorVariance[l] is effective as the hue variation evaluation value because it is close to 100 as the variation of the average hues of the images arranged in a page becomes large, and close to 0 as the variation of the average hues becomes small.

The face size variation will be explained next as the evaluation value used to evaluate the balance in a layout page. For example, if only images of similar face sizes are arranged in a layout result at the time of creating a layout of theme "travel", the layout may be not good. Assume that a good layout is obtained when images of a variety of face sizes, including small and large face sizes on a paper sheet after layout, are arranged in balance. In this case, the face size variation is set large. Hence, the variance of face sizes (the diagonal distance from the upper left to the lower right of a face position) arranged in the lth temporary layout of interest is stored as tmpFaceVariance[l]. A maximum value MaxFaceVariance in tmpFaceVariance[l] is obtained. A face size variation evaluation value FaceVariance[l] of the lth temporary layout can be obtained by FaceVariance[$l$]=100×tmpFaceVariance[$l$]/MaxFaceVariance (4)

That is, FaceVariance[l] is effective as the face size variation evaluation value because it is close to 100 as the variation of the face sizes arranged on a paper sheet becomes large, and close to 0 as the variation of the face sizes becomes small.

As another category, user taste evaluation is usable.

The plurality of evaluation values described above, which are calculated for each temporary layout, will be integrated and referred to as a layout evaluation value for each temporary layout hereinafter. Let EvalLayout[l] be the integrated evaluation value of the lth temporary layout, and EvalValue[n] be N evaluation values (including the evaluation values shown in FIG. 24) calculated above. At this time, the integrated evaluation value can be obtained by $$EvalLayout[l] = \sum_{n=0}^{N} EvalValue[n] \times W[n] \quad (5)$$

where W[n] is the weight of each evaluation value of shown in FIG. 24 for each scene. As a characteristic feature, a different weight is set for each layout theme. For example, the themes "growth" and "travel" are compared, as shown in FIG. 24. For the theme "travel", a number of photos whose quality is as high as possible are preferably laid out in a variety of scenes, and settings are done with a tendency to emphasize the individual evaluation values of the images and the in-page balance evaluation values. On the other hand, for "growth", whether the main character as the growth target properly matches each slot is more important than the image variation, and settings are done with a tendency to emphasize the image/slot matching evaluation than in-page balance or the individual evaluation of images.

In step S2109, a layout list LayoutList[k] for layout result display is generated using EvalLayout[l] calculated in the above-described way. For the layout list, an identifier l is stored in descending order of evaluation value out of EvalLayout[l] for a predetermined number of (for example, five) layouts. For example, if the temporary layout created for the 50th time has the highest score, layout list LayoutList[0]=50. Similarly, after the layout list LayoutList[1], the identifier l for the second highest score is stored.

The flowchart of FIG. 21 has been described above.

Figure 29:
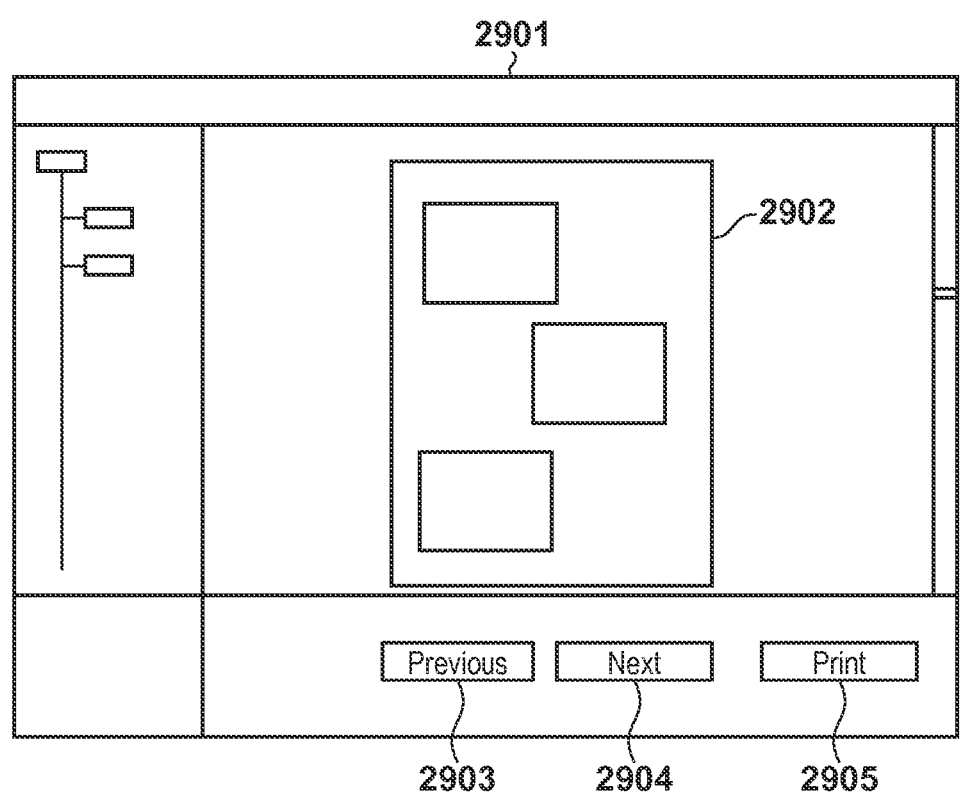
FIG. 29 is a view showing a display example of an automatic layout generation result.

Next, the layout result obtained by the above-described processing is rendered in step S605 of FIG. 6 and displayed. In this embodiment, the rendering result is displayed as shown in FIG. 29. In step S605, the layout identifier stored in the layout list LayoutList[0] is read out, and the temporary layout result corresponding to the identifier is read out from the secondary storage device or RAM. In the layout result, as described above, template information and image names assigned to the respective slots existing in the template are set. In step S605, the layout result is rendered based on these pieces of information using the rendering function of the OS operating on the computer 115 and displayed, as indicated by 2902 in FIG. 29.

When the user presses a Next button 2904 in FIG. 29, the identifier of layout list LayoutList[1] of the next score is read out. The layout result is rendered and displayed in the same manner as described above. This allows the user to view variations of proposed layouts. The user can also redisplay the layout displayed previously by pressing a Previous button 2903. If the user likes the displayed layout, he/she can press a Print button 2905 to cause the printer 112 connected to the image processing apparatus (information processing apparatus) 115 to print the layout result 2902.

Setting of the face reliability level in personal recognition/person grouping and setting of the face reliability level when deciding the trimming ratio of each image will be described here.

Setting of the face reliability level when performing person grouping using personal recognition processing described with reference to FIG. 5 will be explained first. Referring to FIG. 5, in step S501, the images saved in the secondary storage device are sequentially read out and decoded. In this embodiment, assume that 100 images are read out.

In step S502, the database 202 is accessed, and the number of faces included in each of the 100 images and the position information of each face are acquired. Assume that the database 202 stores 150 faces detected in the CPU 100 images. A face reliability level of 0 to 100 is stored in correspondence with each of the 150 faces.

In this embodiment, the AdaBoost face detection algorithm described in Japanese Patent Laid-Open No. 2011-8704 is used as the face detection algorithm. The final value of the additional evaluation value obtained by adding the evaluation values of the respective rectangle regions is stored in the database 202 as the face reliability level.

FIG. 37A is a conceptual view showing 150 faces stored in the database 202 which are arranged in descending order of face reliability level. When acquiring the number of faces and the position information of each face in step S502, the number of faces that exceed a specific face reliability level threshold out of the 150 faces and their position information are acquired. In this case, the faces that should undergo the personal recognition/grouping display need to have a high face reliability level. Hence, the threshold is set high. In this embodiment, as shown in FIG. 37A, the threshold is set to 50, and acquisition in step S502 is done while narrowing down the 150 faces in the 100 images to 60 faces in 50 images. When a face whose face reliability level is more than the threshold 50, the face reliability level is high. For this reason, an erroneous detection result of an object that is not a person is rarely displayed as a person in the person group display example shown in FIG. 7 as the result obtained by performing the procedure from step S504. In this case, the threshold is set to 50. However, the present invention is not limited to this, and a value with which a detection error hardly occurs is freely set.

When collecting faces and performing processing for the faces themselves that should undergo personal recognition/grouping display, it is effective to set the face detection accuracy high to prevent any object other than faces from mixing. This makes it possible to suppress an increase in the number of faces to be registered at the time of personal recognition/grouping display.

Setting of the face reliability level when performing trimming processing in the automatic layout generation processing shown in FIG. 21 will be described next.

In step S2103, the feature amounts of each of the 100 images of this embodiment are acquired from the database 202. As the feature amounts of the images, the IMAGEINFO tags shown in FIG. 11 are arranged as many as the images in the list.

In step S2105, unnecessary images are filtered. In this case as well, filtering is performed using the face reliability level threshold. The face reliability level threshold is set to 50. Consequently, the images and faces are narrowed down to 50 images and 60 faces, as shown in FIG. 37A. The 60 faces of high face reliability levels are collected by setting the threshold "50".

In step S2107, the 50 images are arbitrarily applied to the image arrangement frames of the template shown in FIG. 17, thereby generating L temporary layouts. In this embodiment, L is set to 100. The template shown in FIG. 17 has three slots. Hundred patterns are generated at random based on which three images are selected from the 50 images, in which slots the three images are arranged, and what degree of trimming is done.

All the three slots used in this embodiment are set to arrange persons, as shown in FIG. 11. At the time of trimming an image while placing a person at the center, when the 60 faces having face reliability levels more than the threshold "50" are used, as described above, the following problem is posed. That is, although the 60 faces having face reliability levels more than the threshold "50" are highly reliable, many faces are not judged as faces and remain undetected.

Figure 33:
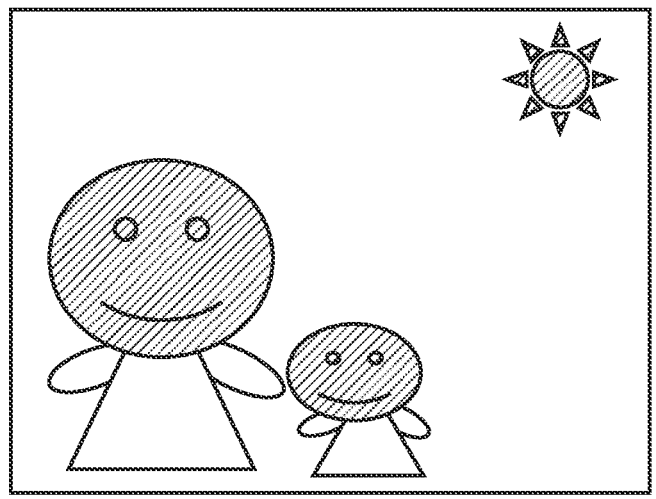
FIG. 33 is a view showing an example of an original image before image processing.
Figure 34A:
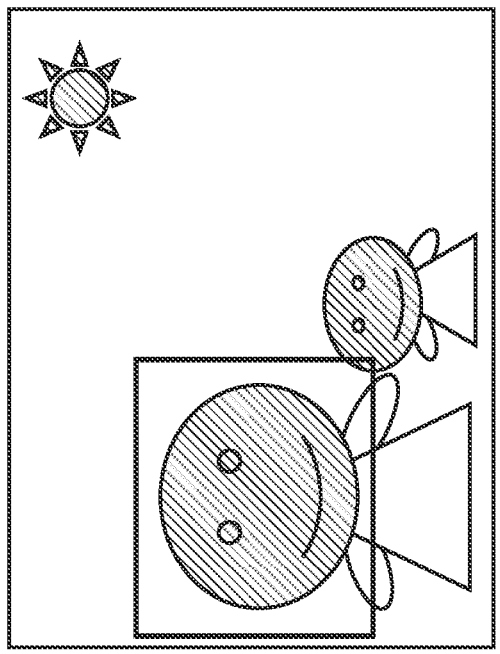
FIGS. 34A and 34B are views showing detection results obtained by performing face detection for the original image shown in FIG. 33 while setting different detection result reliability levels.
Figure 36A:
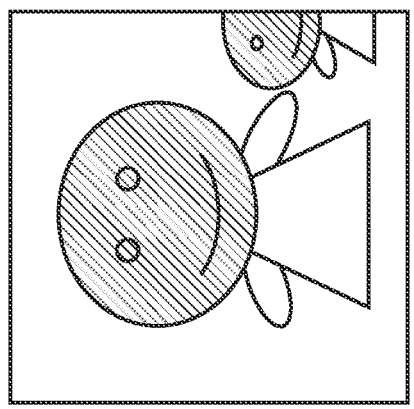
FIGS. 36A and 36B are views showing results obtained by performing processing other than the processing for the faces.

This will be described by exemplifying an image shown in FIG. 33. The image in FIG. 33 includes two persons and the sun. Referring to FIG. 33, assume that the face of the left person has a face reliability level of 80, and that of the right person has a face reliability level of 45. In this case, when the threshold is set to 50, the detection result reliability level is high. Hence, any detected object is almost surely a face, and the possibility of "detection error" is low. However, an "undetected error" occurs, as shown in FIG. 34A. Hence, when the threshold is set to 50, the undetected face of the right person is cut off by trimming, as shown in FIG. 36A.

Figure 36B:
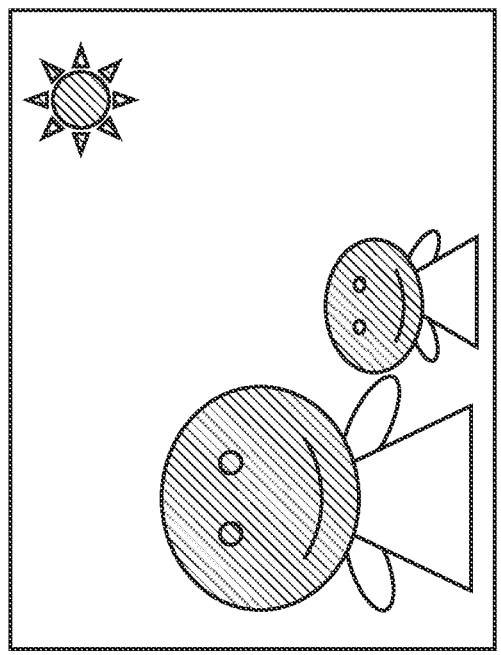

To prevent this, in this embodiment, the threshold is lowered to 30 (second threshold), as shown in FIG. 37B. The 50 images and 60 faces are increased to 50 images and 120 faces, and in this state, trimming is performed while placing a person at the center (second detection). In this case, the faces having face reliability levels more than the threshold "30" are less reliable. Hence, the number of undetected faces decreases, although the number of detection errors increases. Although an erroneous detection result may be included, cutoff of a face by trimming can be reduced, as shown in FIG. 36B. In this case, the threshold is set to 30. However, the present invention is not limited to this, and a value with which an undetected error hardly occurs is freely set.

As described above, to perform processing for a region including a face and a portion other than the face, like trimming processing of cutting a portion other than a face, the face detection accuracy is set low to avoid a face detection failure.

In this embodiment, the face reliability level threshold for trimming is set low in step S2107, thereby obtaining the effect. The same effect as described above can also be obtained in the following way. As the face detection result used for trimming in step S2107, faces whose face reliability levels are more than the face reliability level threshold "50", that is, faces having high face reliability levels are used. In this case, the 100 temporary layouts include faces that are not judged as faces and cut off. Hence, when evaluating the temporary layouts in step S2108, the face reliability level threshold is lowered to 30. At this time, the faces that are cut off in step S2107 are judged as faces this time. This reveals that the faces are cut off. In step S2108, the score is determined in accordance with the lost area of the face. Hence, a temporary layout including a cut face scores low. When a low face reliability level threshold is set not at the time of temporary layout generation but at the time of evaluation in the above-described way, face cut by trimming can be reduced.

In this embodiment, setting the face reliability level in personal recognition/person grouping higher than that when deciding the trimming ratio of each image has been described. The effects of this embodiment will be described in more detail with reference to FIGS. 33 to 35B.

FIG. 34A shows the detection result obtained by setting the face reliability level high for the image shown in FIG. 33, as described above. On the other hand, when the face reliability level is set low for the image shown in FIG. 33, a "detection error" occurs, although no "undetected error" occurs because an object that is not a face is also detected, as shown in FIG. 33B.

Effects and adverse effects obtained when processing for a face is performed for a face detection result will be explained with reference to FIGS. 35A and 35B. FIGS. 35A and 35B respectively show the effects obtained by performing processing for a face, for example, person recognition, skin retouch, face slimming, and mole removal for the face detection results shown in FIGS. 34A and 34B by "O" and the adverse effects by "x". As is apparent from FIG. 35A, when the processing for a face is executed for a detection result other than a face, adverse effects occur. More specifically, the sun is judged to resemble the person B and be identical by person recognition. When skin retouch is applied, the texture of the sun is converted. When face slimming is applied, the sun is converted into a smaller size. When mole removal is applied, the color of a partial region is converted.

Effects and adverse effects obtained when trimming processing is performed for a face detection result will be explained with reference to FIGS. 36A and 36B. FIGS. 36A and 36B respectively show the results obtained by performing processing for a region including a face and a portion other than the face, for example, trimming for the face detection results shown in FIGS. 34A and 34B. In FIG. 36A, the "undetected" person is cut off. On the other hand, the "erroneously detected" sun in FIG. 36B remains in the image but has no adverse effect.

Figure 34B:
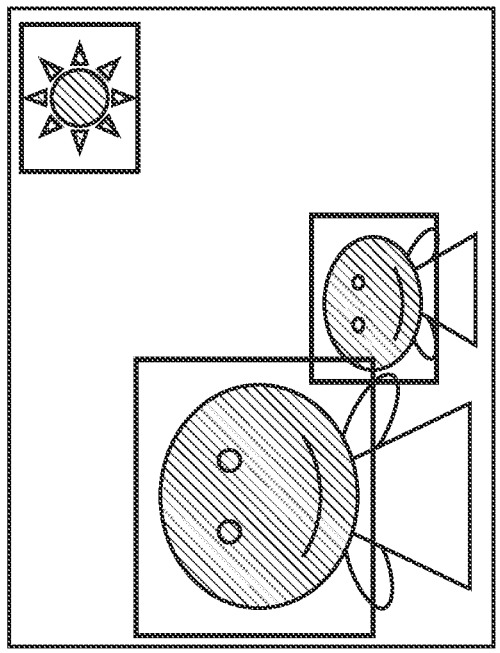

As is apparent from the above description, when performing processing for a face (first image processing), the detection result reliability level is set high (first detection), as shown in FIG. 34A, and when performing processing for a region including a face and a portion other than the face (second image processing other than the first image processing), the detection result reliability level is set low (second detection), as shown in FIG. 34B.

As described above, in this embodiment, when performing personal recognition/grouping display that is processing for a face, the face reliability level is set high, thereby suppressing any object other than a face from mixing. It is possible to set only objects that are surely judged as faces as the target of personal recognition/grouping display. On the other hand, when performing image trimming that is image processing other than face processing, the face reliability level is set low, thereby more properly suppressing face cut of a person. As described above, the face reliability level is changed based on the contents of image processing, that is, the detection criterion threshold is changed, and the detection tolerance is thus changed when the same method is used. This makes it possible to suppress inappropriate image processing for an image.

Second Embodiment

In the first embodiment, a method has been described in which the AdaBoost face detection algorithm is used in personal recognition/grouping display. The same AdaBoost face detection algorithm is used in trimming processing as well. The face reliability level is changed between the processes using the face reliability level threshold.

In the second embodiment, however, a method of changing the face reliability level using different face detection algorithms in accordance with processing will be described.

In personal recognition/grouping display, the AdaBoost face detection algorithm is used, as in the first embodiment. The face reliability level threshold that is the final value of the additional evaluation value obtained by adding the evaluation values of the respective rectangle regions is also set to 50, as in the first embodiment, and 60 faces having high face reliability levels are displayed as a group.

As for the face reliability level in trimming processing of automatic layout generation processing shown in FIG. 21, flesh color detection is used as the face detection algorithm.

Figure 40:
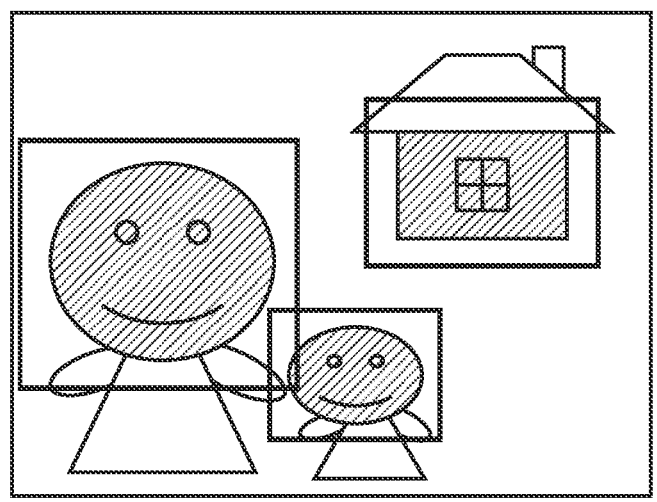
FIG. 40 is a view showing a detection result obtained by flesh color detection for a target image in the second embodiment.

In the flesh color detection, the R, G, and B components of each pixel of an image are converted into known luminance and color difference components (for example, Y, Cb, and Cr components) (the conversion formula will be omitted). An average luminance is obtained from the average value of the Y components, and the average saturation is obtained from the Cb and Cr components. In addition, it is determined whether each of the average luminance and the average color difference component falls within the range of predetermined thresholds representing a satisfactory flesh color region. If the determination ends with "YES", the region is determined to be a face. FIG. 40 illustrates a detection result obtained by performing flesh color detection for an image including two persons and a house. The two persons can be detected. However, the wall of the house is also detected as a person. That is, the face detection algorithm by flesh color detection detects all objects close to the flesh color as persons. Hence, the face reliability level is low.

In the first embodiment, trimming is performed in step S2107 of FIG. 21 for 50 images after filtering of unnecessary images in step S2105. In the first embodiment, the face reliability level threshold is set low, thereby setting 120 face detection results at the center of trimming. In the second embodiment, assume that 120 detection results are similarly obtained by flesh color detection.

The 120 faces detected by flesh color detection have low face reliability levels, as described above, that is, many detection errors occur, although the number of undetected faces is small. It is therefore possible to obtain the same effects as in the first embodiment and prevent a face from being cut by trimming, although an erroneous detection result is included, as shown in FIG. 36B.

That is, when performing processing other than the processing for a face itself, like trimming processing of cutting off a portion other than a face, a face detection algorithm with a low face reliability level is used to avoid a face detection failure.

As described above, in this embodiment, a case has been described in which the face detection algorithm used in processing for a face itself and that used in processing other than the processing for a face itself are different.

In the first and second embodiments, personal recognition/grouping display has been exemplified as processing for a face itself, and image trimming has been exemplified as processing other than the processing for a face itself. However, processes to which the embodiments are applicable are not limited to those.

Figure 41:
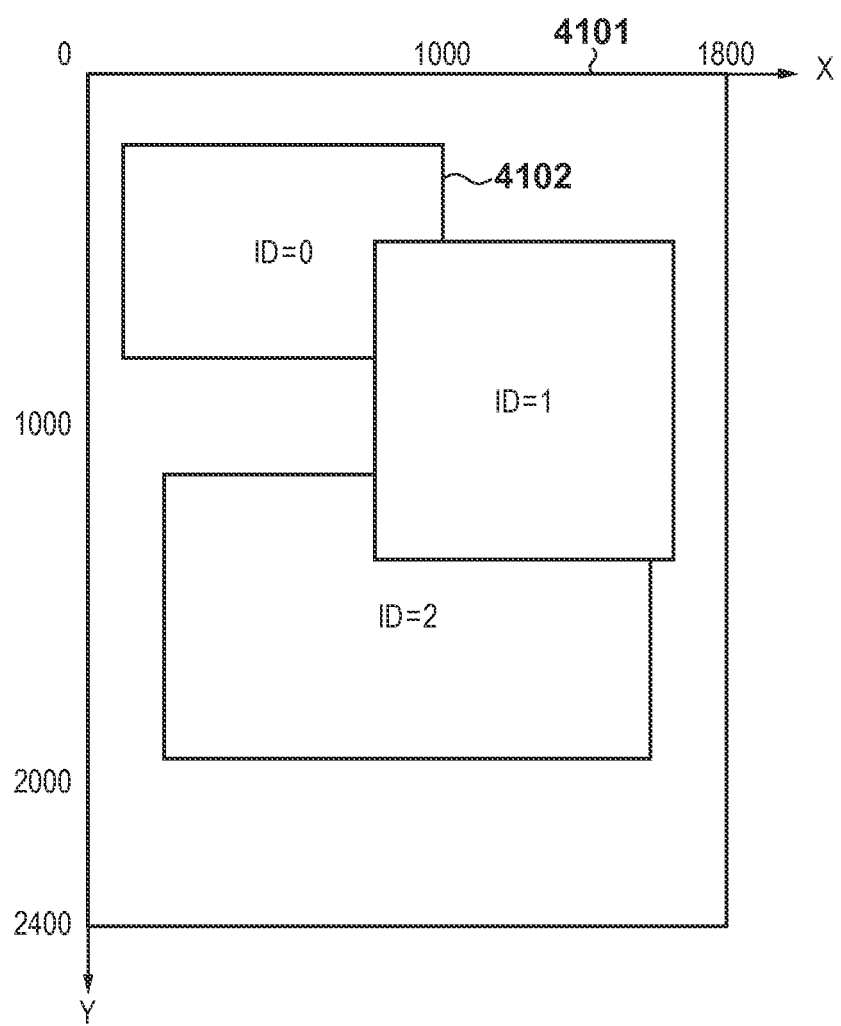
FIG. 41 is a view showing an example of a layout template to obtain the same effects as in the first and second embodiments.

An example of processing other than the processing for a face itself is partial overlay processing of a plurality of images. The effects will be described using a template in which a plurality of image arrangement frames 4102 partially overlap, as shown in FIG. 41.

Figure 42:
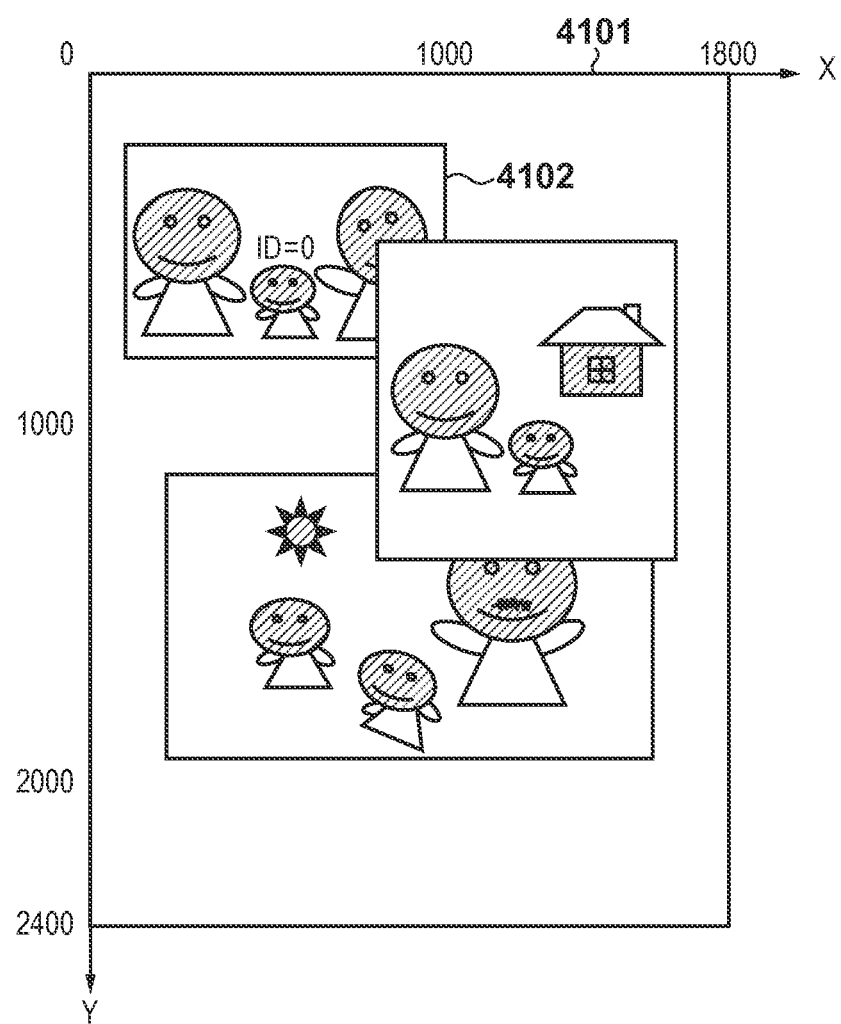
FIG. 42 is a view showing a result obtained by performing superimposition arrangement using the layout template shown in FIG. 41 when the detection result reliability level is high.
Figure 43:
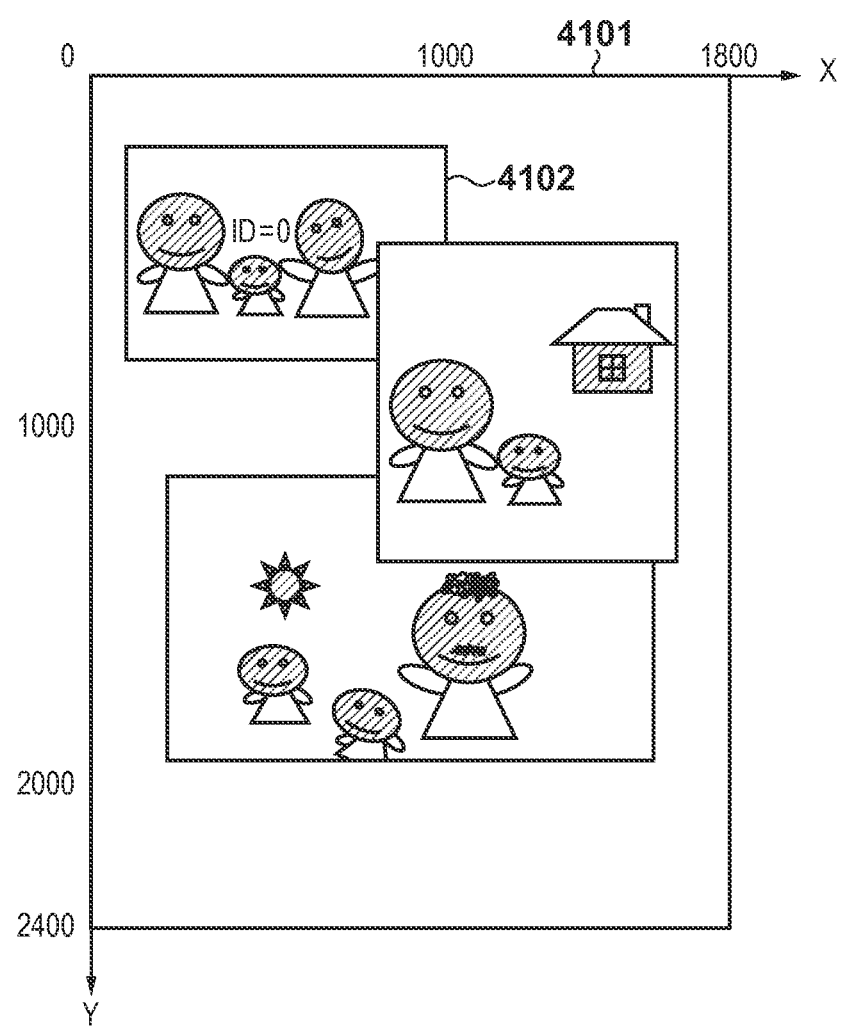
FIG. 43 is a view showing a result obtained by performing superimposition arrangement using the layout template shown in FIG. 41 when the detection result reliability level is low.

FIG. 42 illustrates an example of a layout result when the face reliability level is low. FIG. 43 illustrates an example of a layout result when the face reliability level is high, as in the first and second embodiments.

In FIG. 42, when the face reliability level is set high, a face having a low face reliability level is undetected and arranged at a portion where another image arrangement frame overlaps. However, when the face reliability level is set low, a face having a low face reliability level is detected as well, and the face is suppressed from being arranged at a portion where another image arrangement frame overlaps. As described above, even in processing other than the processing used in the description of the first or second embodiment, the same effects as described above can be obtained by also using, in processing other than the processing for a face itself, a face having a reliability lower than in the processing for a face.

As described above, in this embodiment, when performing personal recognition/grouping display that is processing for a face, a face detection algorithm of a high face reliability level is used. It is therefore possible to suppress any object other than faces from mixing. It is possible to set only objects that are surely judged as faces as the target of personal recognition/grouping display. On the other hand, when performing trimming that is image processing other than face processing, a face detection algorithm of a low face reliability level is used. It is therefore possible to more properly suppress face cut of a person.

As described above, the detection method, in other words, the detection tolerance is changed in accordance with the contents of image processing. It is therefore possible to suppress inappropriate image processing for an image.

Third Embodiment

In the first and second embodiments, the description has been made assuming automatic layout generation processing of laying out a plurality of images on one sheet. The third embodiment will be described concerning application to a single image.

Assume that two kinds of processing are performed for a single image. The first processing is processing for a face itself. The second processing is processing other than the processing for a face itself.

Examples of the processing for a face itself are organ detection, person recognition, red-eye detection, red-eye correction, smile detection, skin detection, skin retouch, sharpening, face slimming, outline correction, and mole removal. Example of the processing other than the processing for a face are character superposition and background shading to be described below.

It is important to apply processing for a face only to a face. To do this, the face reliability level threshold is set high when detecting a face. When the face reliability level threshold is high, many faces remain undetected. However, inexecution of the processing for a face produces no adverse effect, as described in the first embodiment.

On the other hand, the face reliability level threshold used in processing other than the processing for a face is set to be lower than in the processing for a face. When the face reliability level threshold is low, many faces are erroneously detected. However, processing applied to the erroneously detected faces is not processing for a face. Hence, the many detection errors produce no adverse effect.

As described above, even when a plurality of processes are performed for a single image, the effects can be obtained by appropriately setting the face reliability level in accordance with the processing.

Each of the above-described processes for a face will be described.

<Red-Eye Detection Processing and Red-Eye Correction Processing>

Red-eye detection processing is processing of detecting a red-eye region in a face region detection result obtained by face detection processing. Red-eye correction processing is processing of correcting the red-eye by decreasing the brightness and saturation of the color of the detected red-eye region.

<Smile Detection Processing>

This is processing of detecting a specific facial expression in a face region detection result obtained by face detection processing from weights added or subtracted based on a lot of point-to-point luminance differences and an initial value learned by a machine learning algorithm such as AdaBoost.

<Skin Detection Processing And Skin Retouch Processing>

Skin detection processing is processing of detecting a predetermined flesh color region in a face region detection result obtained by face detection processing. Skin retouch processing is processing of performing color conversion processing to set the flesh color to a predetermined target chromaticity value.

<Sharpening Processing>

Figure 46A:
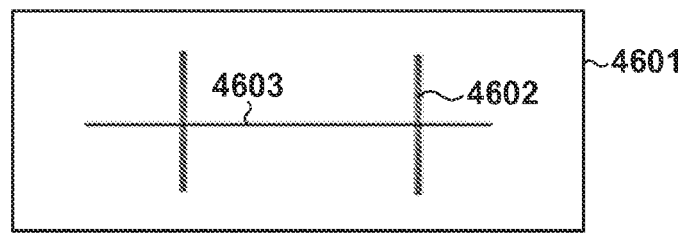
FIGS. 46A, 46B, 46C, and 46D are graphs for explaining a face sharpening method.
Figure 46B:
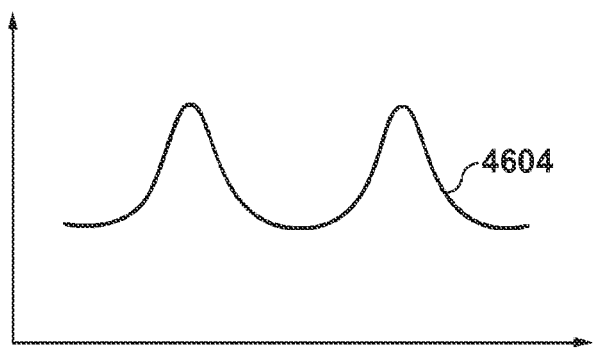
Figure 46C:
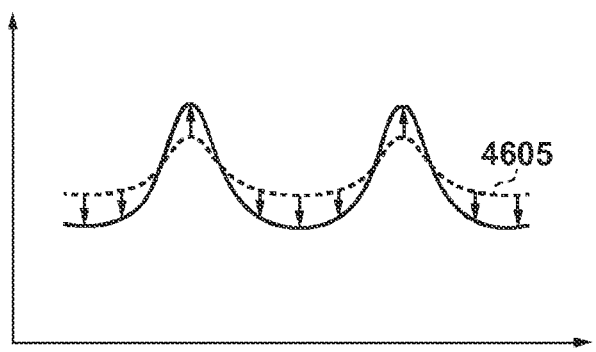
Figure 46D:
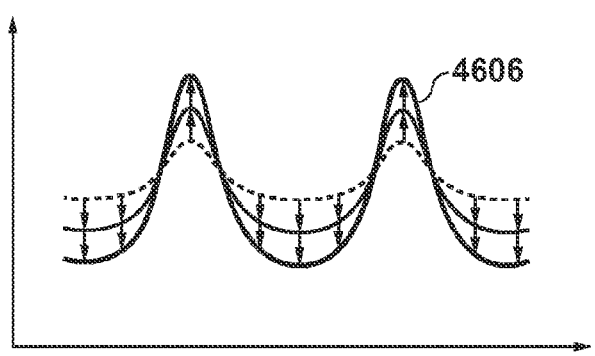

This is processing of applying a diffusing filter to a face region detection result obtained by face detection processing and enhancing the luminance difference between the original image and the image after application of the diffusing filter. The sharpening will be described with reference to FIG. 46A. An original image 4601 includes a drawing portion 4602. The luminance distribution on a line 4603 is indicated by 4604 in FIG. 46B. The luminance distribution of the image after a diffusing filter is applied to the distribution 4604 is indicated by 4605 in FIG. 46C. The luminance difference from the original image 4601 is obtained as indicated by arrows. The sharpening is processing of enhancing the luminance difference and enhancing the original image as indicated by 4606 in FIG. 46D.

<Face Slimming Processing>

This is processing of setting the position of a correction region to correct the outline of a person's face or the correction level based on the information of the feature points of a face and correcting a face region detection result obtained by face detection processing.

<Face Outline Correction Processing>

This is processing of performing organ detection processing for a face region detection result obtained by face detection processing, generating face outline information from the data of the parietal region, mouth, eyes, chin, cheeks, and face center line, and correcting the face outline.

<Mole Removal Processing>

This is processing of detecting a removal target image from a face region detection result obtained by face detection processing and updating the pixel value of a pixel of interest in the removal target image, thereby removing the removal target image.

<Character Superimposition Processing>

This is processing of acquiring, as a background image, an image in which no person's face is detected by face detection processing and merging characters on the background image.

<Background Shading Processing>

This is processing of judging the degree of user's attention giving to a face in accordance with the position, size, or orientation of the face in a face region detection result obtained by face detection processing and changing the focus of the background.

<Background Merging Processing>

This is processing of acquiring, as a background image, an image in which no person's face is detected by face detection processing and merging an inserted image such as a person or an object with the background image.

In the first to third embodiments, object detection is limited to face detection of detecting a person's face. However, the same effects can be obtained even for an object other than a person. For example, Japanese Patent Laid-Open No. 2007-11970 discloses face detection processing of detecting an animal face from an image. In this case, first, following animals are stored in an animal image database as face templates.

An average face of each species of animal such as dog, cat, or rabbit created from a number of images of the species of animal.

An average face of each race of a species of animal, for example, a race of dog such as Chihuahua or German shepherd, which is created from a number of race-specific images.

A face unique to an individual animal created from, for example, photos of a specific pet.

As face information to be stored, various kinds of information used in face detection equivalent to person's face detection are usable, including face outline information, position information of constituent elements of a face such as an eye, nose, and ear, shape information of the constituent elements, and image feature amounts such as an average density/minimum density/maximum density/density histogram. A target image is scanned to search for a region matching a face template. Conversion from feature amounts to scores, score totalization, and the like are performed. A region that matches more than a predetermined determination criterion is detected as a face region. When the predetermined determination criterion is set in accordance with the contents of processing to be performed later using the detection result, the same effects as in the first and third embodiments can be obtained. In addition, when combined with another known animal face detection processing, the same effects as in the second embodiment can be obtained.

Fourth Embodiment

In the first to third embodiments, a case in which an object to be detected is a face has been explained. In the fourth embodiment, a case in which an object to be detected is an eye will be described.

In this embodiment, a pattern matching method is used as an eye detection method.

Figure 45:
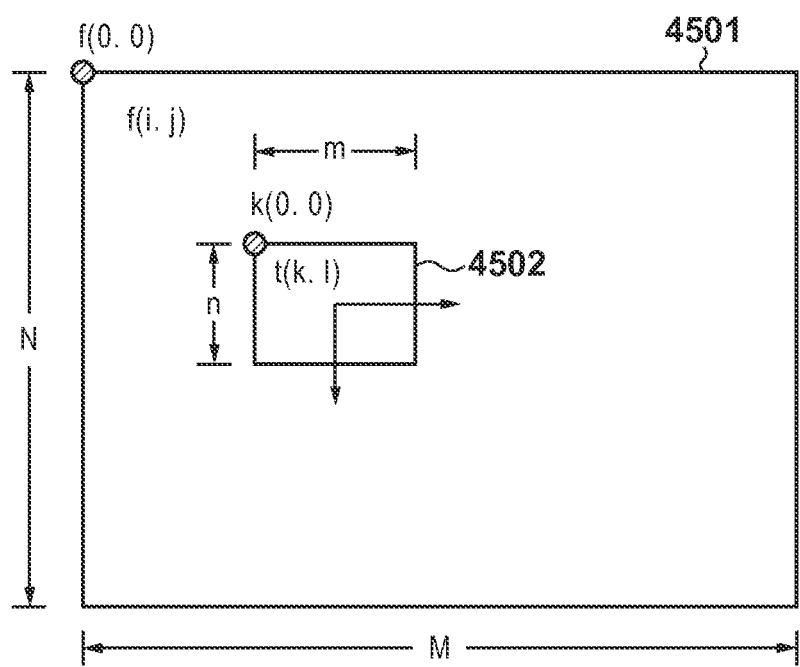
FIG. 45 is a view showing the outline of a pattern matching method.

FIG. 45 is a view showing the outline of a pattern matching method. Reference numeral 4501 denotes an input image. The position of an eye is detected from the input image. Reference numeral 4502 denotes a standard template in which an eye image is registered in advance. In the pattern matching method, a similar pattern between the input image 4501 and the standard template 4502 is extracted while moving the standard template 4502 on the input image 4501. Each time the standard template moves, the similarity at that position is calculated. A region where the similarity is equal to or larger than a predetermined value is determined as an eye.

A formula for obtaining an inter-pattern luminance distance R(i, j) as the similarity when the center of the standard template 4502 is located at a given point (i, j) of the input image 4501 will be described below. The input image 4501 is assumed to have a horizontal size M and a vertical size N, as shown in FIG. 45. The standard template 4502 is assumed to have a horizontal size m and a vertical size n, as shown in FIG. 45. Let f(i, j) be the luminance on the point (i, j) of the input image 4501, and t(k, l) be the luminance on a point (k, l) of the standard template 4502. The origin of (i, j) is the point of the upper left corner of the input image 4501, and the origin of (k, l) is the point of the upper left corner of the standard template 4502. R(i, j) is obtained by $$R(i, j) = \sum_{l=0}^{n-1}\sum_{k=0}^{m-1}\left\{f\left(i - \frac{m}{2} + k, j - \frac{n}{2} + l\right) - t[k \cdot l]\right\} \quad (6)$$

R(i, j) is the sum of the luminance differences between pixels overlapping each other which are obtained for all pixels of the standard template 4502 in the region where the input image 4501 and the standard template 4502 overlap when the center of the standard template 4502 is placed at the point (i, j). The smaller the value R(i, j) is, the higher the eye reliability level and the similarity between them are. This processing is performed for the entire region of the input image 4501 while sequentially shifting the center of the standard template from the point (i, j), and an m×n region at the center point (i, j) where R(i, j) falls below a predetermined threshold is judged as an eye.

In this embodiment, red-eye correction is performed as processing for eyes themselves. In addition, trimming is performed as processing other than the processing for eyes themselves. In this embodiment as well, the reliability level of the eye to be used in the processing is changed in accordance with the subsequent processing, like face detection described in the first to third embodiments. More specifically, the eye reliability level threshold used to judge an object as an eye is set high so as to use an eye having a high eye reliability in red-eye correction.

The effects of the change of the eye reliability level threshold will be described with reference to FIGS. 44A and 44B. FIG. 44A illustrates a detection result obtained by detecting eyes from an original image including two persons, one Japanese flag, and one traffic light using eye detection of a high detection result reliability level. Since the detection result reliability level is high, and each detected object is almost surely an eye, no "detection error" occurs. However, the eyes of the right person are not detected, and an "undetected error" occurs. FIG. 44B illustrates a detection result obtained by detecting eyes using face detection of a low detection result reliability level. Since the detection result reliability level is low, and an object that is not an eye is also detected, no "undetected error" occurs. However, the flag and the traffic light are detected as eyes, and a "detection error" occurs.

Processing for eyes, for example, red-eye correction is performed for the eye detection results shown in FIGS. 44A and 44B. In this case, the red colors of the Japanese flag and the traffic signal are corrected to black in FIG. 44B. That is, applying the processing for eyes to a detection result other than an eye produces an adverse effect.

Hence, the eye reliability level threshold is set high, as described above. It is therefore possible to reliably perform red-eye correction to the region that surely corresponds to an eye, as in FIG. 44A. It is therefore possible to reduce the possibility that the red portions of the Japanese flag and the traffic signal are corrected to black. On the other hand, when performing trimming, the eye reliability level threshold used to judge an object as an eye is set to be lower than in red-eye correction so as to use even an eye of a low eye reliability level. It is therefore possible to reduce the possibility that a person is partially or wholly cut off by trimming because almost all eyes are detected, as shown in FIG. 44B. Note that when the eye reliability level is set high, the person having undetected eyes is not regarded as a person and cut off in FIG. 44A. That is, applying the processing other than the processing for eyes themselves to an eye detection result produces an adverse effect.

In red-eye correction, when the color of a detected eye is redder than a preferable gamut, the brightness or saturation is lowered, thereby replacing the pixel values of the red-eye portion. In this embodiment, the eye reliability level threshold is changed in accordance with processing. However, the present invention is not limited to this. In addition to the method of changing the threshold in accordance with processing, another eye detection processing of another detected eye reliability level may selectively be used. For example, as the method of detecting an eye to be used in the processing for eyes, an eye detection method described in Japanese Patent Laid-Open No. 2003-317084 can also be used, which detects an eye of a high reliability level. In Japanese Patent Laid-Open No. 2003-317084, a candidate of the image portion of an eye detected from a face image is set as an eye candidate. Two eye candidates are extracted as a pair of candidates. Whether the pair of candidates can be both eyes is evaluated using a both eye pair evaluation value used to evaluate the likelihood of both eyes.

As described above, in this embodiment, the eye reliability level is set high for processing for eyes, thereby suppressing an object other than eyes from being processed. On the other hand, the eye reliability level is set low for processing other than the processing for eyes itself, thereby more properly suppressing a human face from being cut.

Other Embodiments

The embodiments of the present invention have been described above. However, the basic arrangement of the present invention is not limited to that described above. The above-described embodiments are merely means for obtaining the effects of the present invention. If the effects of the present invention can be obtained using another similar method or different parameters, this arrangement is also incorporated in the scope of the present invention, as a matter of course.

Example of processing for an object itself are object detection and object correction. In the above-described embodiments, personal recognition/person grouping, organ detection, person recognition, red-eye detection, red-eye correction, smile detection, skin detection, skin retouch, sharpening, face slimming, and mole removal have been exemplified. However, the present invention is not limited to those.

In the above-described embodiments, character superposition processing, background shading processing, and background merging processing have been exemplified above as the processing other than the processing for an object itself. However, the present invention is not limited to those.

In the above-described embodiments, the detection reliability level when performing processing for a face itself or processing for eyes itself is set to be higher than that in processing other than these processes. However, as far as this condition is satisfied, the remaining conditions are not particularly limited.

For example, when performing processing for only a face or processing for only eyes, the detection reliability level may further be changed in accordance with the contents of the processing.

In the above-described embodiments, an example in which an output matter is generated by arranging a plurality of images in one page has been described. However, the present invention is also applicable to output of an album including a plurality of pages.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154008, filed Jul. 9, 2012, which is hereby incorporated by reference herein in its entirety.

What is claimed is:

1. An apparatus comprising:
a specifying unit configured to specify a face region from an image; and
a processing unit configured to perform processing for a region in the image,
wherein in a case where the processing performed by the processing unit is associated with the face region in the image, the specifying unit specifies the face region based on a first specifying method, and
wherein in a case where the processing performed by the processing unit is associated with a region other than the face region in the image, the specifying unit specifies the face region based on a second specifying method which specifies the face region with a specification level wider than that of the first specifying method.

2. The apparatus according to claim 1, wherein the specifying unit detects one or more candidate regions based on one algorithm, and specifies one or more face regions from the detected one or more candidate regions by using thresholds that are different from each other,
wherein in a case where the processing performed by the processing unit is associated with the one or more face regions in the image, the one or more face regions are specified by using a first threshold as the first specifying method,
wherein in a case where the processing performed by the processing unit is associated with the region other than the one or more face regions in the image, the one or more face regions are specified by using a second threshold which is lower than the first threshold as the second specifying method.

3. The apparatus according to claim 1, wherein the specifying unit specifies the face region based on algorithms that are different from each other,
wherein in a case where the processing performed by the processing unit is associated with the face region in the image, the face region is specified based on a first algorithm as the first specifying method,
wherein in a case where the processing performed by the processing unit is associated with the region other than the face region in the image, the face region is specified based on a second algorithm, which specifies the face region with the specification level wider than that of the first algorithm, as the second specifying method.

4. The apparatus according to claim 1, wherein in a case where the processing unit corrects the face region, the specifying unit specifies the face region based on the first specifying method.

5. The apparatus according to claim 1, wherein the face region specified by the specifying unit is a person's face region, or an organ region of the person's face region.

6. The apparatus according to claim 5, wherein in a case where the processing unit performs at least one of personal recognition, person grouping, organ specifying in a person's face, person recognition, red-eye specifying, red-eye correction, smile specifying of a person, specifying of a flesh color region of a person, color conversion processing of a flesh color of a person, processing of enhancing a person's face, slimming of a person, and mole removal of a person, the specifying unit specifies the face region based on the first specifying method.

7. The apparatus according to claim 1, wherein in a case where the processing unit performs at least one of trimming, partial overlay processing of a plurality of images, processing of superimposing a character on a background image, background shading, and background merging, the specifying unit specifies the face region based on the second specifying method.

8. A processing method comprising:
specifying a face region from an image, and
performing processing for a region in the image,
wherein in a case where the processing is associated with the face region in the image, the face region is specified based on a first specifying method, and
wherein in a case where the processing is associated with a region other than the face region in the image, the face region is specified based on a second specifying method which specifies the face region with a specification level wider than that of the first specifying method.

9. The method according to claim 8, wherein, in the specifying, one or more candidate regions are detected based on one algorithm, and one or more face regions are specified from the detected one or more candidate regions by using thresholds that are different from each other,
wherein in a case where the processing is associated with the specified one or more face regions in the image, the one or more face regions are specified by using a first threshold as the first specifying method,
wherein in a case where the processing is associated with the region other than the specified one or more face regions in the image, the one or more face regions are specified by using a second threshold which is lower than the first threshold as the second specifying method.

10. The method according to claim 8, wherein, in the specifying, the face region is specified based on algorithms that are different from each other,
wherein in a case where the processing is associated with the face region in the image, the face region is specified based on a first algorithm as the first specifying method,
wherein in a case where the processing is associated with the region other than the face region in the image, the face region is specified based on a second algorithm, which specifies the face region with the specification level wider than that of the first algorithm, as the second specifying method.

11. The method according to claim 8, wherein in a case where the face region is to be corrected in the processing to be performed, the face region is specified based on the first specifying method.

12. The method according to claim 8, wherein the face region is a person's face region or an organ region of the person's face region.

13. The method according to claim 12, wherein in a case where at least one of personal recognition, person grouping, organ specifying in a person's face, person recognition, red-eye specifying, red-eye correction, smile specifying of a person, detection of a flesh color region of a person, color conversion processing of a flesh color of a person, processing of enhancing a person's face, slimming of a person, and mole removal of a person is to be performed, the face region is specified based on the first-specifying method.

14. The method according to claim 8, wherein in a case where at least one of trimming, partial overlay processing of a plurality of images, processing of superimposing a character on a background image, background shading, and background merging is to be performed, the face region is specified based on the second specifying method.

15. A non-transitory computer-readable storage medium storing a program that causes a computer to execute:
specifying a face region from an image; and
performing processing for a region in the image,
wherein in a case where the processing is associated with the face region in the image, the face region is specified based on a first specifying method, and
in a case where the processing is associated with a region other than the face region in the image, the face region is specified based on a second specifying method which specifies the face region with a specification level wider than that of the first specifying method.

16. The medium according to claim 15, wherein, in the specifying, one or more candidate regions are detected based on one algorithm, and one or more face regions are specified from the detected one or more candidate regions by using thresholds that are different from each other,
wherein in a case where the processing is associated with the specified one or more face regions in the image, the one or more regions are specified by using a first threshold as the first specifying method,
wherein in a case where the processing is associated with the region other than the one or more face regions in the image, and the one or more face regions are specified by using a second threshold which is lower than the first threshold as the second specifying method.

17. The medium according to claim 15, wherein, in the specifying, the face region is specified based on algorithms that are different from each other,
wherein in a case where the processing is associated with the face region in the image, the face region is specified based on a first algorithm as the first specifying method,
wherein in a case where the processing is associated with the region other than the face region in the image, the face region is specified based on a second algorithm, which specifies the face region with the specification level wider than that of the first algorithm, as the second specifying method.

18. The medium according to claim 15, wherein in a case where the face region is to be corrected in the processing to be performed, the face region is specified based on the first specifying method.

19. The medium according to claim 15, wherein the face region is a person's face region or an organ region of the person's face region.

20. The medium according to claim 15, further comprising setting one of the first specifying method and the second specifying method in accordance with contents of processing to be performed, wherein the face region is specified based on the set specifying method.

21. The method according to claim 8, further comprising setting one of the first specifying method and the second specifying method in accordance with contents of processing to be performed, wherein the face region is specified based on the set specifying method.

22. The medium according to claim 15, wherein in a case where at least one of personal recognition, person grouping, organ specifying in a person's face, person recognition, red-eye specifying, red-eye correction, smile specifying of a person, specifying of a flesh color region of a person, color conversion processing of a flesh color of a person, processing of enhancing a person's face, slimming of a person, and mole removal of a person is to be performed, the face region is specified based on the first specifying method.

23. The medium according to claim 15, wherein in a case where at least one of trimming, partial overlay processing of a plurality of images, processing of superimposing a character on a background image, background shading, and background merging is to be performed, the face region is specified based on the second specifying method.

24. An apparatus comprising:
a specifying unit configured to specify an object from an image; and
a processing unit configured to perform processing for the image,
wherein in a case where the processing unit performs at least one of personal recognition and person grouping, the specifying unit specifies the object based on a first specifying method, and
wherein in a case where the processing unit performs at least one of trimming and partial overlay processing of a plurality of images, the specifying unit specifies the object based on a second specifying method which specifies the object with a specification level wider than that of the first specifying method.

25. The apparatus according to claim 24, wherein the specifying unit detects one or more candidate objects based on one algorithm, and specifies one or more objects from the detected one or more candidate objects by using thresholds that are different from each other,
wherein in a case where the processing unit performs at least one of personal recognition and person grouping, the one or more objects are specified by using a first threshold as the first specifying method,
wherein in a case where the processing unit performs at least one of trimming and partial overlay processing of a plurality of images, the one or more objects are specified by using a second threshold which is lower than the first threshold as the second specifying method.

26. The apparatus according to claim 24, wherein the specifying unit specifies the object based on algorithms that are different from each other,
wherein in a case where the processing unit performs at least one of personal recognition and person grouping, the object is specified based on a first algorithm as the first specifying method,
wherein the processing unit performs at least one of trimming and partial overlay processing of a plurality of images, the object is specified based on a second algorithm, which specifies the object with the specification level wider than that of the first algorithm, as the second specifying method.

27. The apparatus according to claim 24, wherein the object specified by the specifying unit is a person's face or an organ of the person's face.

28. A processing method comprising
specifying an object from an image; and
performing processing for the image,
wherein in a case where at least one of personal recognition and person grouping is to be performed, the object is specified based on a first specifying method, and
wherein in a case where at least one of trimming and partial overlay processing of a plurality of images is to be performed, the object is specified based on a second specifying method which specifies the object with a specification level wider than that of the first specifying method.

29. The method according to claim 28, wherein one or more candidate objects are detected based on one algorithm and one or more objects are specified from the detected one or more candidate objects by using thresholds that are different from each other,
wherein in a case where at least one of personal recognition and person grouping is to be performed, the one or more objects are specified by using a first threshold as the first specifying method,
wherein in a case where at least one of trimming and partial overlay processing of a plurality of images is to be performed, the one or more objects are specified by using a second threshold which is lower than the first threshold as the second specifying method.

30. The method according to claim 28, wherein the object is specified based on algorithms that are different from each other,
wherein in a case where at least one of personal recognition and person grouping is to be performed, the object is specified based on a first algorithm as the first specifying method,
wherein at least one of trimming and partial overlay processing of a plurality of images is to be performed, the object is specified based on a second algorithm, which specifies the object with the specification level wider than that of the first algorithm, as the second specifying method.

31. The method according to claim 28, wherein the object is a person, a person's face, or an organ of the person's face.

32. A non-transitory computer-readable storage medium storing a program that causes a computer to execute
specifying an object from an image; and
performing processing for the image,
wherein in a case where at least one of personal recognition and person grouping is to be performed, the object is specified based on a first specifying method, and wherein in a case where at least one of trimming and partial overlay processing of a plurality of images is to be performed, the object is specified based on a second specifying method which specifies the object with a specification level wider than that of the first specifying method.

33. The medium according to claim 32, wherein one or more candidate objects are detected based on one algorithm and one or more objects are specified from the detected one or more candidate objects by using thresholds that are different from each other,
wherein in a case where at least one of personal recognition and person grouping is to be performed, the one or more objects are specified by using a first threshold as the first specifying method,
wherein in a case where at least one of trimming and partial overlay processing of a plurality of images is to be performed, the one or more objects are specified by using a second threshold which is lower than the first threshold as the second specifying method.

34. The medium according to claim 32, wherein the object is specified based on algorithms that are different from each other,
wherein in a case where at least one of personal recognition and person grouping is to be performed, the object is specified based on a first algorithm as the first specifying method,
wherein in a case where at least one of trimming and partial overlay processing of a plurality of images is to be performed, the object is specified based on a second algorithm, which specifies the object with the specification level wider than that of the first algorithm, as the second specifying method.

35. The medium according to claim 32, wherein the object is a person's face or an organ of the person's face.

* * * * *